United States Patent [19]
Cullen et al.

[11] Patent Number: 5,452,374
[45] Date of Patent: Sep. 19, 1995

[54] SKEW DETECTION AND CORRECTION OF A DOCUMENT IMAGE REPRESENTATION

[75] Inventors: John F. Cullen, Palo Alto, Calif.; Koichi Ejiri, Narashino, Japan

[73] Assignees: Ricoh Corporation, Menlo Park, Calif.; Ricoh Company Ltd., Tokyo, Japan

[21] Appl. No.: 863,948

[22] Filed: Apr. 6, 1992

[51] Int. Cl.$^6$ .............................................. G06K 9/32
[52] U.S. Cl. .................................. 382/293; 382/293
[58] Field of Search ........................... 382/46, 61, 44; 395/137, 141; 340/727

[56] References Cited

U.S. PATENT DOCUMENTS

| | | | |
|---|---|---|---|
| 4,558,461 | 12/1985 | Schlang | 382/46 |
| 4,829,452 | 5/1989 | Kang et al. | 382/46 |
| 5,054,098 | 10/1991 | Lee | 382/46 |
| 5,191,642 | 3/1993 | Quick et al. | 340/727 |
| 5,285,504 | 2/1994 | Pavlidis et al. | 382/46 |

FOREIGN PATENT DOCUMENTS 2222475  7/1990  United Kingdom .

OTHER PUBLICATIONS

H. S. Baird, "The Skew Angle of Printed Documents," AT&T Bell Laboratories, pp. 20–25 (undated).
Y. Nakano, Y. Shima, H. Fujisawa, J. Higashino, and M. Fujinawa, "An Algorithm for the Skew Normalization of Document Image," Shinshu University, Central Research Laboratory, Hitachi Ltd., pp. 8–13 (Jun. 1990).
H. S. Baird, "Global-to-Local Analysis," AT&T Bell Laboratories, pp. 1–16 (Sep. 1988).
S. N. Srihari and V. Govindaraju, "Analysis of Textual Images Using the Hough Transform," Department of Computer Science, Machine Vision and Applications, pp. 141–153 (Sep. 1989).

*Primary Examiner*—Yon J. Couso
*Attorney, Agent, or Firm*—Blakely, Sokoloff, Taylor & Zafman

[57] ABSTRACT

In a character recognition system, a method and apparatus for correcting the skew of a document image. Skew correction is typically performed during segmentation of the document image into text and non-text parts. Skew correction generally involves skew angle determination and correction of the document image based on the skew angle. A skew angle is determined through the steps of: providing a set of associated rectangles representing the document image, identifying a column edge associated with the set of associated rectangles, comparing rectangles from the set of associated rectangles to identify those that are in the same column and suitably far apart, calculating a tangential angle between the rectangles identified and identifying the most common tangential angle as the skew angle. Once the skew angle is determined, correction of the document image is made by constructing real skewed rectangles from corresponding extracted rectangles and rotating each of the real skewed rectangles around an origin coordinate for a distance based on the skew angle.

6 Claims, 19 Drawing Sheets

SKEW DETECTION AND CORRECTION OF A DOCUMENT IMAGE REPRESENTATION

BACKGROUND OF THE INVENTION

1. Field of the Invention

The present invention relates to the field of character recognition systems, in particular to a method for identifying an angle of skew and correction thereof, used in connection with document segmentation.

2. Description of the Related Art

Optical character recognition provides for creating a text file on a computer system from a printed document page. The created text file may then be manipulated by a text editing or word processing application on the computer system. As a document page may be comprised of both text and pictures, or the text may be in columns, such as in a newspaper or magazine article, an important step prior to character recognition is document segmentation. Document segmentation is the identification of various text, image (picture) and line segment portions of the document image. As only the text portions of the document image can be converted into a text file, it is desirable to limit the character recognition to only areas of the document which have text, and to provide an order by which those portions of text are inserted into a text file. Ordering of text files is desirable in order to avoid the creation of text files that would not logically correspond to the original document. Such text files would be of diminished value.

A difficult problem confronted by all document segmentation systems is that of skew. Skew occurs whenever the representation of the document does not properly represent horizontal lines of text on the actual document page image. Skew must be corrected prior to performing character recognition of the document image. Skew correction generally requires the determination of a skew angle and modification of a document image representation based on the skew angle. With regards to skew angle determination, a first known method is based on the Hough Transform. In the Hough Transform, the bit mapped image of the document is transformed into a polar coordinate space. By identifying the maximum peak in the polar coordinate, the skewed angle is directly obtained from its polar angle. The Hough Transform method requires extensive computation time, and is found to not be sufficiently sensitive enough to the skew angle.

A second known method is described in the article entitled, "The Skew Angle of Printed Documents", H. S. Baird, Proceeding SPSE 40th Conference Symposium Hybrid Imaging Systems, Rochester, N.Y., May 1987, pgs. 21–24. In this second method, after two dimensional Fourier transform of the original document image, it is again projected to polar coordinates. The maximum of the projected values gives the angle of skew. This method has been found to provide high accuracy, up to 2 minutes of arc, but again requires extensive amounts of processing time.

It is an object of the present invention to provide a skew determination and correction apparatus and method which is accurate and makes efficient use of system resources.

SUMMARY

A method and apparatus for determining and correcting skew in a document image, is described. Correcting skew requires the calculation of a skew angle. A skew angle is accurately determined in less computation time, since determination is based on a data representation of a document image, i.e. rectangles, rather than actual pixel data. Further, by neglecting short distance rectangles, the detected angle shows a sharp peak and a high order of accuracy.

Skew angle determination in the present invention is generally comprised of the steps of: providing a set of associated rectangles representing the document image, identifying a column edge associated with the set of associated rectangles, comparing rectangles from the set of associated rectangles to identify those that are in the same column and suitably far apart, calculating a tangential angle between the rectangles identified and identifying the most common tangential angle as the skew angle.

Skew correction using the skew angle in the present invention is generally comprised of the steps of: constructing real skewed rectangles from corresponding extracted rectangles and rotating each of the real skewed rectangles around an origin based on the skew angle.

BRIEF DESCRIPTION OF THE DRAWINGS

FIG. 7 illustrates a histogram chart for identifying a column edge, as may be utilized in an implemented embodiment of the present invention.

FIG. 8b illustrates a histogram chart for identifying a skew angle from a collection of measured tangential angles, as may be utilized in an implemented embodiment of the present invention.

DETAILED DESCRIPTION OF THE PREFERRED EMBODIMENT

The present invention has been implemented as part of a document segmentation system, and is a method and apparatus for correcting for the skew in a document image. In the following description, specific details are set forth such as data structures, in order to provide a thorough understanding of the present invention. It will be apparent, however, to one skilled in the art that the present invention may be practiced without such specific details. In other instances, well known components that interface with the implemented embodiment, e.g. image scanning techniques or character recognition, have not been shown in detail in order not to unnecessarily obscure the present invention.

Overview of an Optical Character Recognition System in the Implemented Embodiment The document segmentation system of an implemented embodiment is practiced within the scope of an optical character recognition system. Such an optical character recognition system can be broken down into three fundamental parts; a scanning part, a segmenting part and a character recognition part. The scanning part, typically an optical scanner, creates a bit-mapped representation of a document image. This bit-mapped image is a representation of the document as a set of logical bit values that may be interpreted and manipulated by an appropriate processing means. Such scanning means are commercially available and provide various scanning resolutions, e.g. 300 DPI. As will become apparent, scanning resolution is a parameter for determining certain threshold values used in the document segmentation method. Skipping to the character recognition part, character recognition is the interpreting of the bit mapped representations into their corresponding characters or symbols. Various methods for character recognition are known in the art, including template matching and shape analysis. Character recognition is known to require extensive processing time.

Finally, document segmentation is the identification and classification of distinct blocks in the document image. Document segmentation is based on an analysis of the bit-mapped representation of the image. Document segmentation is important because it distinguishes areas on a document which are text, from those which are image (or non-text). The document segmentation system of the implemented embodiment provides coordinate addresses within the test-mapped image, identifying blocks of text to the Character Recognition Part. This permits the Character Recognition part to ignore those portions of the document image that are not text. This is desirable in that it reduces the amount of data that must be processed by the Character Recognition part.

Figure 1A:
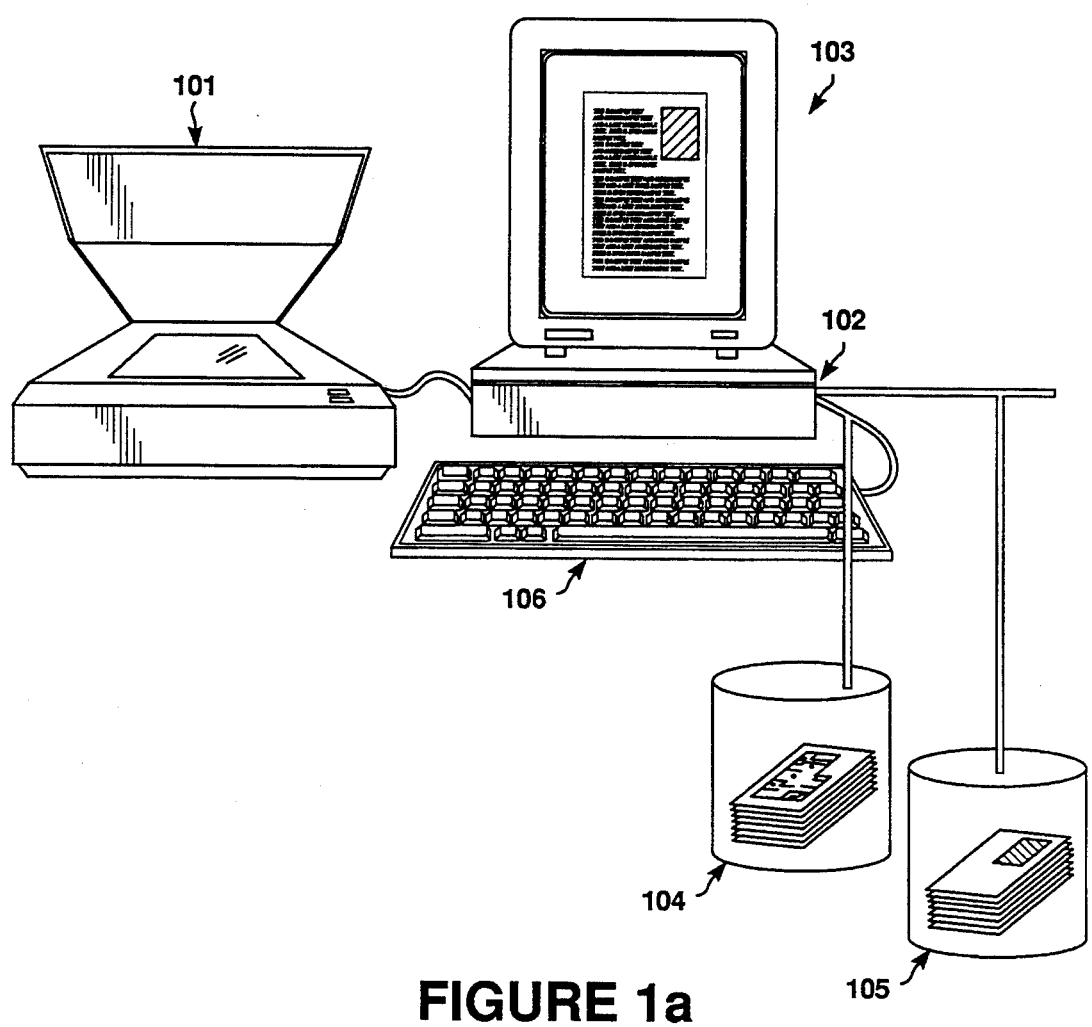
FIG. 1a illustrates a computer system coupled with a scanner device as may be utilized by the character recognition system in the implemented embodiment of the present invention.

A computer system that performs optical character recognition is illustrated in FIG. 1a. Such an optical character recognition system consists of a scanner 101, a host computer 102 having a Central Processing Unit (CPU), memory, display device 103 and an input device such as a keyboard 106. A bit-mapped representation of a document is created by the scanner 101. After the character recognition process is completed a text file has been created and is saved to a text database 104 coupled to the host computer 102. The display device 103 is used to verify the results of the segmentation. Further, illustrated in FIG. 1a is an image database 105. It should be noted that in the implemented embodiment, the portions identified as text would be interpreted and stored in the text database 104 while the portions identified as image could be stored in the image database 105.

Figure 1B:
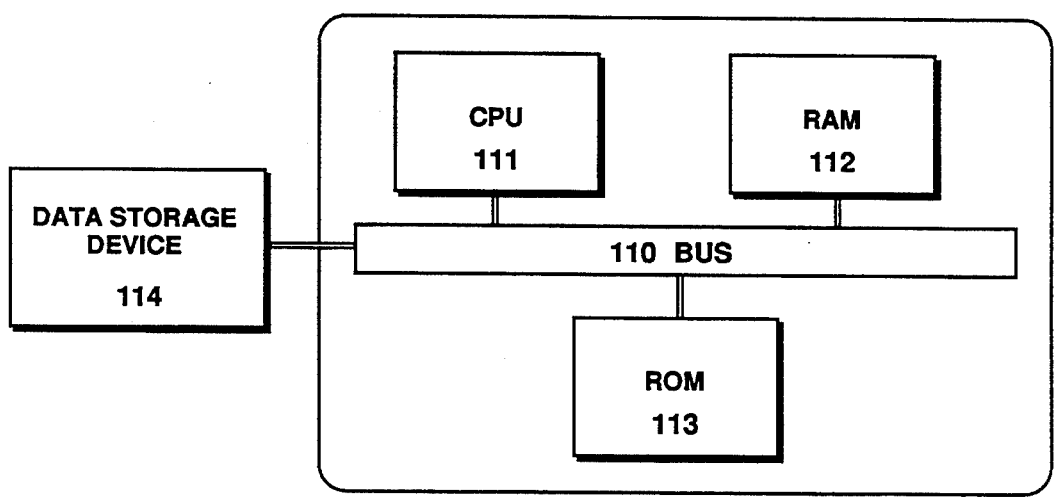
FIG. 1b describes in more detail a host computer as illustrated in FIG. 1a, as may be utilized by the character recognition system in an implemented embodiment of the present invention.

FIG. 1b illustrates the host computer 102 of FIG. 1a in more detail. The host computer illustrated in FIG. 1b comprises a bus or other communication means 110 for communicating information, a processing means 111, e.g. a Central Processing Unit (CPU) coupled with the bus 110 for processing information, a random access memory (RAM) or other storage device 112 (commonly referred to as a main memory) coupled with the bus 110 for storing information and instructions for the CPU 111, a read only memory (ROM) or other static storage device 113 coupled with the bus 110 for storing static information and instructions for the CPU 111. The CPU 111 is used to apply the segmentation and classification functions of the implemented embodiment to the bit-mapped representation of the document. As will be described in greater detail below, such functions include scanline compression, run length extraction and classification, rectangle construction and classification, skew detection and correction, rectangle merging and text block ordering.

Also coupled to bus 110 is a data storage device 114, such as a magnetic or optical disk and disk drive. The data storage device 114 is used for storing instructions, parameter information, rectangle information and other data, including the text database 104 and the image database 105 described with respect to FIG. 1a used in the segmentation method of the implemented embodiment.

Overview of the Document Segmentation System of the Implemented Embodiment

Figure 2A:
FIG. 2a illustrates a boundary rectangle for a text word, as utilized by an implemented embodiment of the present invention.
Figure 2B:
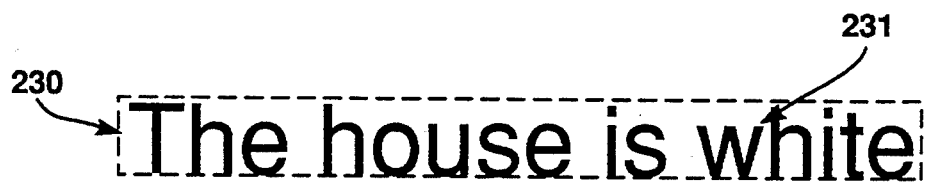
FIG. 2b illustrates a boundary rectangle for a text sentence as utilized by an implemented embodiment of the present invention.

In the method of the present invention a boundary rectangle is used to describe the features on a document. A boundary rectangle will define the bounds of a pattern, e.g. a word. Referring to FIG. 2a, rectangle 220 provides a spatial boundary for the word "house" 221. Referring to FIG. 2b, rectangle 230 provides a spatial boundary for the sentence "The house is white" 231. Heuristics, or characteristics are then provided which dictates how rectangles are processed.

Figure 2C:
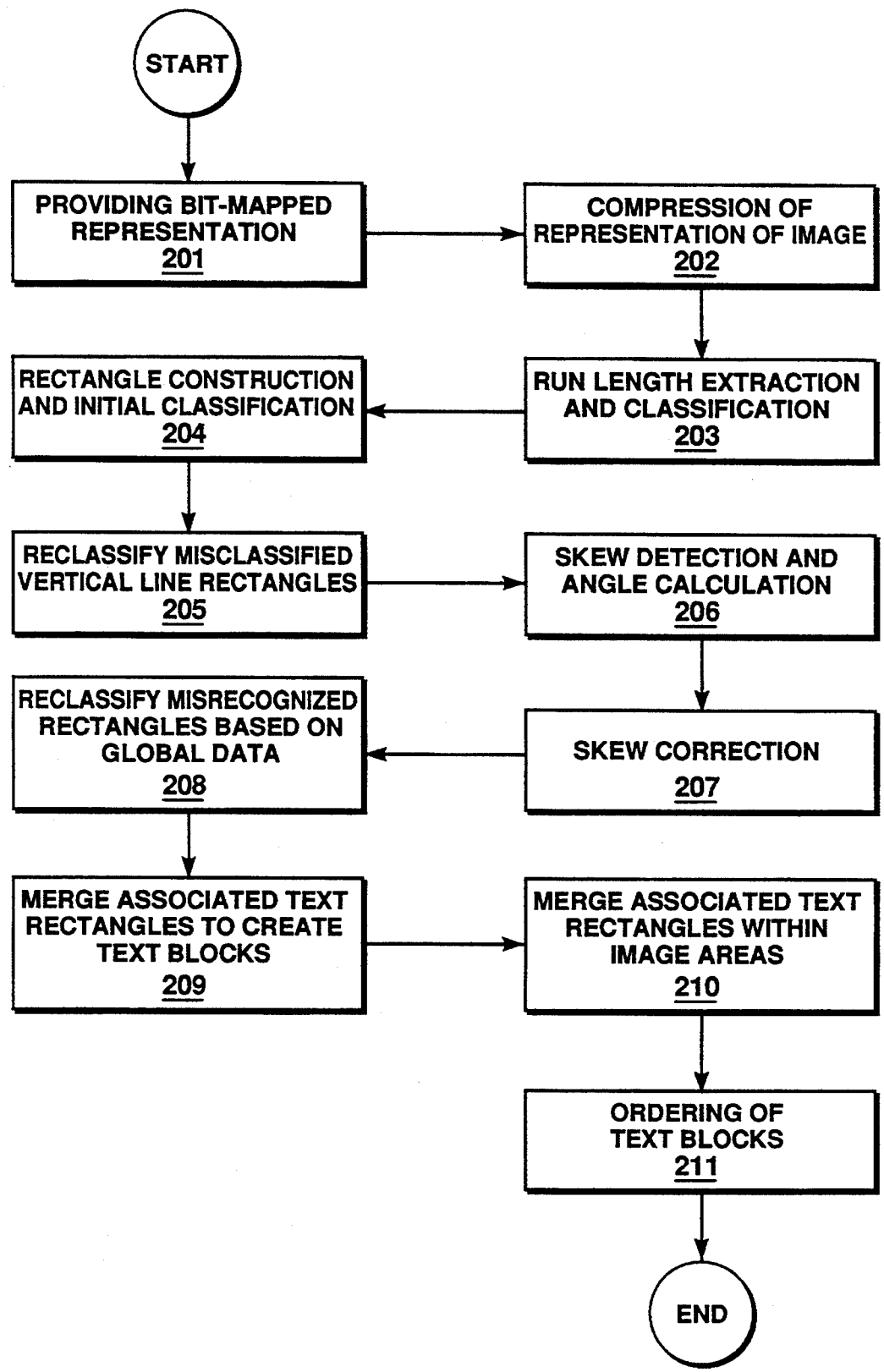
FIG. 2c is a flowchart of the steps for document segmentation in an implemented embodiment of the present invention.

The overall method of image segmentation and classification is illustrated in FIG. 2c. Each of the steps illustrated in FIG. 2c are described briefly here and in greater detail below. Referring to FIG. 2c, a bit-mapped representation of the document is provided, step 201. Note that this may be from the scanner 101 of FIG. 1a or via some other means of providing a bit-mapped representation of a document. As methods for the creation of the bit-mapped representation of the document are known in the art, no further discussion on such creation of bit-mapped representation of a document is deemed necessary. It is of note that preferably, the bit-mapped representation will consist of scanlines corresponding to portions of the image. Thus, the entire representation will be comprised of a predetermined number of scanlines, typically the resolution of the scanning means creating the bit-mapped representations. In any event, the representation of the document is than compressed, step 202. This means that the amount of data that is used to represent the document is reduced generally by more efficiently representing redundant data. Effectively, the reduced data that needs to be processed implies less system memory is required and less processing time is required. The output of the step 202 is a collection of compressed scanlines.

Run lengths are extracted and classified from the compressed scanlines, step 203. Run lengths are consecutive black pixels on a scanline. In terms of the bit-mapped representation, run lengths are consecutive bits that have a logical one value. Intermixed and dependant on step 203, is rectangle construction and initial classification, step 204. As described above, it is the rectangles which are used to identify distinct blocks of the document. It should be noted that the rectangles are first initially classified as they are created. Once all the rectangles have been created and initially classified, it has been determined that certain rectangles will be misclassified as vertical lines. Thus, certain vertical lines that were classified, must be reclassified, step 205. It would be apparent to one skilled in the art to merge step 205 into step 204, but separating the two steps allows for more efficient processing.

Next, skew detection and skew angle calculations are performed, step 206. An estimation of the skew on the document is made from analyzing the objects (i.e. rectangles) that represent words. This is done at an early stage of the merging process. Skew estimation is important not only to the segmentation process, but also to any other process that may be employed to work on the same copy of the image, for example the Character Recognition process. Once skew has been detected and a skew angle calculated, skew correction on the rectangles describing the features of the document is performed, step 207.

After the document representation has been corrected for skew, it is again necessary to re-classify any mis-recognized rectangles based on some further provided heuristic data, step 208. This is done by comparing features of the rectangles to a predetermined set of rules. Once the re-classification step is completed, associated text rectangles are merged to create text blocks, step 209. Note that as of step 209 the associated rectangles will have been previously identified as type UNKNOWN. These text blocks are typically columns of text that may be separated on the document by pictures (images). As a further step, text rectangles within image areas are merged, step 210. Finally, the text blocks must be logically ordered, step 211. It is desirable to logically order text blocks to facilitate creation of a text file with text in an order corresponding to the layout of the document.

This document segmentation method as practiced on the implemented embodiment computer system minimizes the use of system memory, while at the same time maintaining a high processing speed. Further, the method maintains a very high accuracy for document segmentation and area classification. The overall method for document segmentation can generally be described as utilizing a bottom-up approach. First the bit mapped representation is reduced to a data set containing the bare essential features of the document. Objects (run lengths and rectangles) are then extracted from the reduced document image by incremental merging, starting from the basic level of groups of adjacent black pixels, working up to objects that represent columns of text, pictures, lines, etc.. Classification of objects occur throughout the whole process of merging.

In specific areas of the method, namely rectangle classification, merging, and block ordering, a top-down method is used. A rule base, constructed from known heuristics of page layout for general documents is used. In the English Language, for example, words are combined to form objects known as lines; lines are combined to form objects known as columns; blocks in columns are ordered top to bottom; and columns are ordered left to right.

It is significant that the method of the present invention efficiently classifies portions of a document that are halftone pictures or graphics. Halftone pictures or graphics are identified on a document based on the size of the generated rectangles in a corresponding portion of the document. The high compression utilized means that fine detail becomes merged. Since run length size distributions are contained within rectangle area boundaries, classification can be done based on rectangle boundary size and the characteristics of the run length size distributions.

Compression of the Bit-mapped Representation

The compression of the bit-mapped representation of the document for segmentation purposes facilitates faster processing. The compression technique of the implemented embodiment causes a 4 to 1 reduction in the actual amount of data used to represent the document. However, a 32 to 1 reduction is achieved in the amount of data that needs to be processed. The technique is based on combining four (4) horizontal scanlines into one compressed scanline, using a logical bitwise OR operator. In the implemented embodiment, a scanline refers to a row of bits that represents picture elements (pixels) of the image extending from left to right across the image. This is contrasted with a compressed scanline, where a byte value will represent a pixel value. The number of scanlines chosen to be compressed, i.e. 4, is based on experimentation. It has been determined that 300 dots per inch (dpi) is the minimum resolution at which optical character recognition (ocr) can be accurately carried out. Therefore, the choice of 4 scanlines means that at the minimum resolution, the method of the implemented embodiment can process documents having as low as 6 point typeface.

The compression technique has two components; vertical compression and horizontal compression. It should first be noted that in this description with regards to a scanline, the term a black pixel will denote a bit having a logical one value, while a white pixel will denote a bit with a logical zero value with regards to a compressed scanline, a black pixel will denote a non-zero logical value, while a white pixel will denote a byte with a zero value. The basic premise for vertical compression of bits is that if there exists one or more black pixels at the same location in four adjacent scanlines, then the resultant pixel is considered a black pixel. However, if no black pixels exist at the same location, then the resultant pixel is considered a white pixel. Horizontal compression occurs as a result of the definition of a pixel value as a byte. Note that the vertical compression causes an initial 4 to 1 compression. The vertically compressed data is then compressed 8 to 1 through horizontal compression, thus resulting in an effective 32 to 1 compression in terms of data being processed. In terms of memory used to store the image, the actual compression is 4 to 1.

Figure 3:
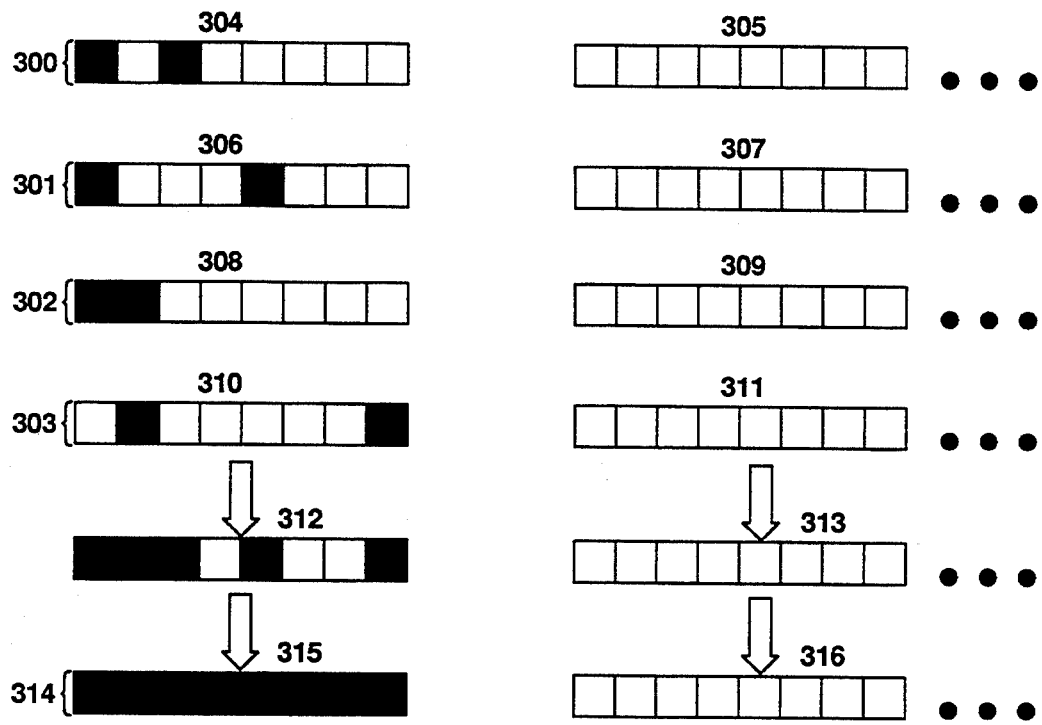
FIG. 3 illustrates compressing of scanlines as performed in an implemented embodiment of the present invention.

FIG. 3 illustrates scanline compression in the implemented embodiment. Illustrated in FIG. 3 are four scanlines 300–303, respectively, from the original, uncompressed bit-mapped representation. It should be noted that for each of the scanlines 300–303, two bytes are represented, 304–311, respectively. Also illustrated are resultant bytes 312–313 of vertical compression. Each of the bytes 304–311 and resultant bytes 312–313, is comprised of 8 bits. Finally, the result from horizontal compression of each of the resultant bytes 312 and 313 is illustrated in the compressed scanline 314 as bytes 315 and 316. To create the resulting byte 312, a logical OR operation is performed on the corresponding bits in the bytes 304, 306, 308, and 310. The same logical 0 R operation is performed on the corresponding bits in the bytes 305, 307, 309, and 311 to create the resultant byte 313. As resultant byte 312 contains black bits, i.e. would have a non-zero logical value, the byte 312 represents a black pixel in compressed scanline 314. This is represented as byte 315. As resultant byte 313 contains no black bits, i.e. would have a zero logical value, the byte 313 represents a white pixel in compressed scanline 314. This is illustrated as byte 316. Although not illustrated, this procedure is repeated for each of the bits (and bytes) for the scanlines 300–303.

It should further be noted that in the processing to create the compressed scanline, system memory is only required for storing the equivalent of three (3) scanlines of the original bit-mapped representation. A first scanline memory is for a scanline being processed, the second scanline memory is for intermediate workspace and the third scanline memory is for the compressed scanline to be saved.

The method calls for compression to a byte in order to obtain speed advantages that come from byte-wise processing. However, it would be apparent to one skilled in the art to provide an alternative embodiment where a bit value is used to represent a pixel value in the compressed scanlines. This of course would necessitate the modification of logic and data structures for data representation and manipulation. Such an alternative embodiment would not depart from the spirit and scope of the present invention.

Run Length Extraction and Classification

In the implemented embodiment, a run length is defined as a set of contiguous black pixels in a compressed scanline. As above, in a compressed scanline a black pixel is represented by a byte with a non-zero value, while a white pixel is represented by a byte with a zero value. In defining a run length, a first element specifies the location of the black pixel where the transition from white to black occurs, and a second element specifies where the transition from black to white, occurs. Each compressed scanline may have one or more run lengths. For each compressed scanline, a run length set, comprised of run length records is created.

A data structure for a run length record variable in the C programming language is illustrated in Table A. Those skilled in the art would be familiar with such programming techniques to define the run length structure.

TABLE A

RUN LENGTH DATA STRUCTURE

| 1. | struct aRun { |
| 2. | RECT *parentRect; |
| 3. | int sx; |
| 4. | int ex; |
| 5. | int fl; |
| 6. | }; |
| 7. | Typedef struct aRun RUN; |

Line 1 of Table A is the structure definition, for a structure named aRun. At line 2 of the data structure in Table A is the definition of a RECT variable of the type *parentRECT. The data structure *parentRECT includes information concerning the parent rectangle and compressed scanline to which the run length corresponds. At line 3 is an integer variable sx which defines the starting position of the run length. At line 4 is an integer variable ex which defines the end positions of the run length. At line 5 is an integer variable fl which is a flag to indicate the type of run length. Finally, at line 7 a variable RUN is defined which is of the type aRUN. It would be apparent that modifications of this data structure, e.g. retaining the number of pixels in the run length rather than the end position, could be utilized without departing from the spirit and scope of the present invention.

As described above, a run length set is created for each compressed scanline. A run length set is typically an array having elements of the type aRun. Alternatively, it may be a linked-list data structure where each variable points to the next run length structure in the set (list).

The basic process of run length extraction involves searching along a compressed scanline for sequences of contiguous black pixels. This occurs by examining the byte values in the scanline for non-zero logical values. The first pixel location of such a sequence is set as the start value for the run length. The next white pixel is then sought, i.e. examining the successive byte values in the scanline for a logical zero value. This pixel is set as the end value for the run length. In this manner all the run lengths for a scanline are extracted. Once all the run lengths for the scanline are extracted, the set is labeled as the set of run lengths existing at the n-th scanline from the top of the compressed bit mapped representation.

Classification is then made based on the size (length in pixels) of the run length and the document image resolution. The resolution is dependant on the scanning means utilized. It is necessary to account for resolution since a high resolution document image will necessarily define more pixels than a low resolution document image. Not accounting for resolution would limit the implemented embodiment to scanner devices having a particular resolution. As will be described in more detail below, the classification of the run length is used to make an initial classification of associated extracted rectangles. The classification rules for a 300 dpi scanned document, based on heuristic data are as follows:

1. Assign SHORT run length type if less than or equal to 2 pixels.
2. Assign LONG run length type if greater than 60 pixels.
3. Assign MEDIUM run length type if run length is greater than 2 pixels and less than or equal to 60 pixels.

In the implemented embodiment, flags and corresponding values have been defined for describing the run length types. A RNFL_MEDIUM flag has been defined with a value of zero (0) to define a medium run length. A RNFL_SHORT flag has been defined with a value of one (1) to define a short run length. A RNFL_LONG has been defined with a value of two (2) to define a long run length. Once the above classification has been determined, the corresponding flag value is inserted into the f1 field (line 5 in Table A).

Figure 4:
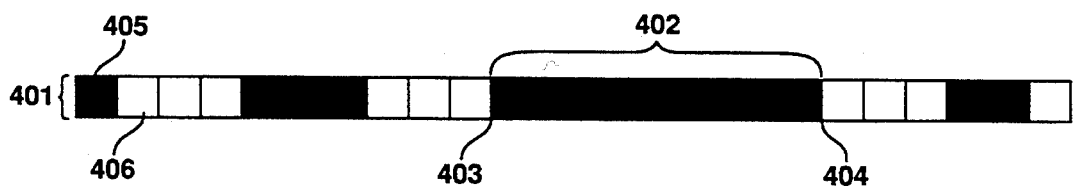
FIG. 4 illustrates a method for run length extraction from a compressed scanline as may be performed in an implemented embodiment of the present invention.

FIG. 4 illustrates a scanline of pixels and a run length. It should be noted that FIG. 4 is simplified in that a byte has been reduced to its corresponding pixel value. Fox example, the pixel 405 represents a non-zero byte value (i.e. a black pixel) while a pixel 406 represents a zero byte value (i.e. a white pixel). A scanline 401 has a portion 402 that is comprised of a series of contiguous black pixels. The address of a pixel 403 designates the start of the run length, while the address of a pixel 404 designates the end of the run length. Assuming that the pixel 403 is at address 312 and the pixel 404 is at address 414 and that the threshold for a long run length is 100, the resulting run length record would have starting position value sx of 312, an ending position value ex of 414 and run length flag value f1 of 2 (for a long run length).

At any point in the processing, only two sets of records describing the run lengths of two compressed scanlines are utilized and stored in memory. A first set of records describe the current scanline run lengths, and a second set describes the previous scanline run lengths. As will be described in greater detail below, the previous scanline information is used for rectangle extraction. Prior to reading a new set of compressed scanline records, the old current set of records is copied to the memory location for holding the records of the previous scanline. The records describing the new scanline are than read into the memory location for holding the records describing the current scanline and is processed accordingly. This continues until all the compressed scanlines have been processed.

Rectangle Construction and Initial Classification

As the run lengths are extracted on the compressed scanlines, rectangles describing the features of the document are being constructed. These rectangles describe the bounds of contiguous black pixels in both the horizontal and the vertical directions in the document image. Run lengths are one dimensional, whereas rectangles are two dimensional. As noted above, the run length information of a current and previous compressed scanline are required for the rectangle extraction step.

Relationships between the current compressed scanline and the previous compressed scanline determine whether the current compressed scanline run lengths get assigned to existing rectangles, or if a new rectangle is created. When the first compressed scanline is processed, each run length generates a new rectangle. As each new current compressed scanline gets processed, any rectangles associated with a run length in that line, get expanded appropriately. A run length is associated with a rectangle if the run length exists within the boundary of the rectangle. A rectangle is complete and no longer gets expanded when all of the pixels of the current compressed scanline that are adjacent to the rectangle are white. In other words, a rectangle is terminated when no run lengths of the current compressed scanline are within the rectangle boundary. A new rectangle is created when a run length is not completely within the boundary of a rectangle. Such a scheme allows for the creation of rectangles which overlap. Such overlapped rectangles are provided for in subsequent steps of the method.

Figure 5:
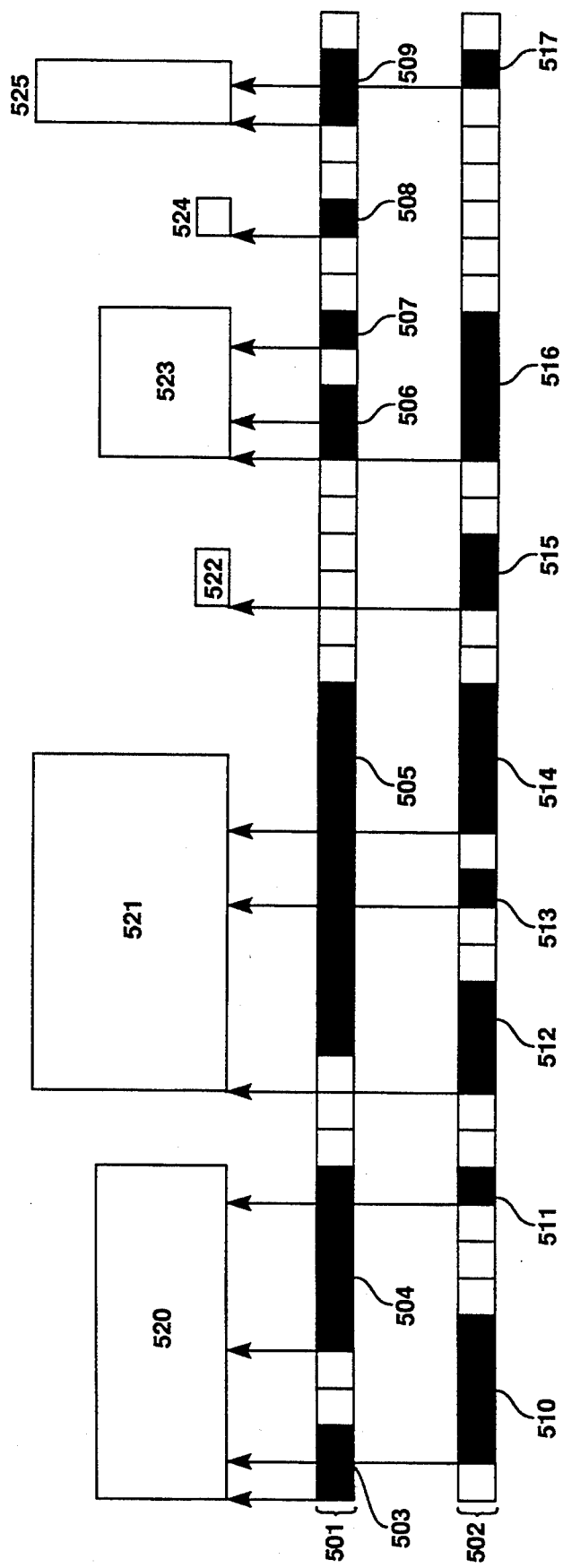
FIG. 5 illustrates a method for rectangle construction from previous and current compressed scanlines as may be performed in an implemented embodiment of the present invention.

Construction of a rectangle from the run lengths current and previous compressed scanline is illustrated in FIG. 5. In FIG. 5, a previous compressed scanline 501 and a current compressed scanline 502 each contain a plurality of run lengths. The previous compressed scanline 501 has run lengths 503–509 while the current compressed scanline 502 has run lengths 510–517. It should be noted that as illustrated, the scanlines 501 and 502 are bit-wise aligned. This means that the left most bit in the scanline 501 corresponds to the left most bit in scanline 502. Also illustrated in FIG. 5 are the rectangles 520–525. If a predetermined relationship between a run length in the current compressed scanline and a run length in the previous compressed scanline exists, the run length in the current compressed scanline is added to an existing rectangle. If no such relationship exists, a new rectangle is created.

The predetermined relationship between run lengths in the previous and current compressed scanlines implements the rectangle constructed rules described above. The relationship that must exist in order for a run length to be added to an existing rectangle is that the starting point for a run length in the current scanline must have continuity with a run length in the previous scanline. For example, with reference to FIG. 5, the starting point for run length 510 has continuity with run lengths 503 and 504 of compressed scanline 501.

With respect to run length 515, no continuity exists with a run length in the previous scanline 501. Thus, the new rectangle 522 is created. For run length 508 in the previous scanline 501, there is no continuity to a run length in the current scanline, thus the rectangle 524 is completed and will not be added to.

In FIG. 5, the run lengths of scanline 501 have been added to existing rectangles as follows: run lengths 503–504 are added to rectangle 520, run length 505 is added to rectangle 521, run lengths 506–507 are added to rectangle 523 and run length 509 is added to rectangle 525. It should be noted that run length 508 caused the creation of rectangle 524. With respect to scanline 502, the run lengths 510-511 are added to rectangle 520, the run lengths 512-514 are added to rectangle 521, the run length 516 is added to rectangle 523 and the run length 517 is added to rectangle 525. As noted above, the run length 515 has caused the creation of rectangle 522.

As rectangles are being constructed, a count is kept of the different types of run lengths that comprise each rectangle. When a rectangle has been completed, initial rectangle classification is performed. Based on the run length characteristics and the rectangle sizes, the initial classification into one of four types, namely vertical line (VL), horizontal line (HL), picture image (IMG), or unknown (UNKNOWN), is made. The following general rules, again scaled to document resolution, are used to make the classification:

1. IF (Run lengths are all of Type Long) AND (Rectangle Height is less than or equal to the Runlength Type Short threshold) THEN classify rectangle as type HL.
2. IF (Run lengths are all of Type Short) AND (Rectangle Height is greater than the Runlength Type Short threshold) THEN classify rectangle as type VL.
3. IF (Run lengths are Type Long) OR (Rectangle width is less than or equal to the Runlength type Long Threshold)) AND (Rectangle height is greater than an Image Height Rectangle Threshold) THEN classify rectangle as type IMG.
4. Classify all remaining rectangles as UNKNOWN.

Note that rule 1 identifies horizontal lines, rule 2 identifies vertical lines, rule 3 identifies image rectangles and rule 4 provides a default unknown classification.

For a b 300 dpi document image, the threshold value for the Runlength Type Short Threshold has been determined to be 2 pixels while the Image Height Rectangle Threshold has been determined to be 82 pixels.

The above classification rules are constructed from known parameters of what a typical document should contain. These parameters may be modified depending on the resolution of the bit-mapped representation of the document, and/or may be tuned to a specific document by analyzing the rectangle size distribution.

At the end of processing the compressed document representation, a list of rectangles describing all the basic objects in the document image will have been created. As will be described below, a rectangle of type UNKNOWN, will usually contain text.

In the implemented embodiment, the font size of characters may be between 6 point to 48 point. The rules are based in part on this assumption. However, it would be apparent to one skilled in the art to provide for smaller or larger font sizes by modifying the threshold values used to do the basic classification.

The final classification for rectangle type VL is done at the rectangle extraction time as described above. The following rules are then used to test and refine the initial classifications made:

Rule 1: corrects for misclassified text, '1', 'l' or 'I' that were classified as vertical lines
IF (rectangle type is VL) AND (rectangle height is less than threshold height for unknown rectangles) THEN (classify rectangle as type UNKNOWN)
Rule 2: re-assigns rectangles based on font size. If greater than maximum font size, they must be pictures.
IF(rectangle height, scaled by a factor of 2) is greater than (threshold for picture height) THEN (classify rectangle as type IMG)
Rule 3: assigns image areas based on the premise that words tend to be longer than they are high.
IF ((rectangle height scaled by factor of 4) added to (rectangle width)) is greater than (threshold for picture height scaled by a factor of 4) THEN (classify rectangle as type IMG)
Rule 4: describes the criteria for defining a horizontal line based on the premise that longer horizontal lines tend to be thicker than short horizontal lines that divide text blocks or columns.
IF ((rectangle width) as a ratio of (rectangle height scaled by a factor of 4)) is greater than (threshold for width of horizontal line) THEN (classify rectangle as type HL)
Rule 5: describes the criteria for differentiating a horizontal line from a long line of small (e.g. 6 point) font text. IF ((rectangle width) as a ratio of (rectangle height)) is greater than (threshold for horizontal line width height ratio) THEN (classify rectangle as type HL).

For a 300 dpi image, the values for the various thresholds are: Threshold height for unknown rectangles is 5, threshold picture height is 82, threshold width of a horizontal line is 77 and threshold for horizontal line width height ration is 15.

As with run lengths, a data structure is provided to store the rectangle information. Such a data structure is illustrated in TABLE B.

TABLE B

| RECTANGLES DATA STRUCTURE | |
|---|---|
| 1. | struct aRectangle{ |
| 2. | struct aRectangle *nextRect; |
| 3. | struct aRectangle *prevRect; |
| 4. | int sx; |
| 5. | int sy; |
| 6. | int ex; |
| 7. | int ey; |
| 8. | unsigned char fl; |
| 9. | int tau; |
| 10. | int mu; |
| 11. | struct aRectangle *nextTextRect; |
| 12. | }; |
| 13. | typedef struct aRectangle RECT; |

The data structure at lines 2 and 3 provides pointers to succeeding and previously processed rectangles. As will become apparent, this facilitates the processing of rectangles in subsequent steps. Coordinate points describing the spatial location of the rectangle are provided at lines 4-7. Lines 4-5 provide the X-Y coordinates for the upper left point of the rectangle while lines 6-7 provide the X-Y coordinates for the lower right point of the rectangle. Line 8 provides a flag value for the rectangle. This flag value indicates the record type. The lines 9-10 are text block ordering variables "TAU" and "MU". Calculation and assignment of these text block ordering values is described in more detail below. Line 11 provides a pointer to the next text rectangle. Such a pointer facilitates further processing steps including the merging of rectangles of type UNKNOWN to create Text Blocks. Finally, Line 13 illustrates the definition of a rectangle variable.

As rectangle parameter information is continually being used during the segmentation process, it is stored in a predetermined location of system memory. Such a data structure containing parameter information is illustrated in Table C.

TABLE C
PARAMETER DATA STRUCTURE

| | |
|---|---|
| 1. | struct parameters} |
| 2. | FILE *fh; |
| 3. | char *filename; |
| 4. | int flag; |
| 5. | long min_w_hl_rect_ext; |
| 6. | int min_h_vl_rect_ext; |
| 7. | int line_reduction; |
| 8. | int thresh_short_run; |
| 9. | int thresh_long_run; |
| 10. | int max_img_width; |
| 11. | int thr_h_img; |
| 12. | int thr_w_hl; |
| 13. | int thr_h_unknown1; |
| 14. | int thr_h_unknown2; |
| 15. | int thr_unknown_length; |
| 16. | int thr_noise_length; |
| 17. | int hl_w_h_ratio; |
| 18. | int txt_bl_min_hl; |
| 19. | int txt_bl_min_w; |
| 20. | int thr_horiz_merge; |
| 21. | int thr_vert_merge; |
| 22. | int thr_horiz_pict_ttle; |
| 23. | int thr_vert_pict_ttle; |
| 24. | }; |
| 25. | typedef struct parameters DOC; |

The parameters data structure is exemplary of a type definition for storing information used during the document segmentation and object classification process. This parameter data is related to the resolution of the scanning device used. Descriptions of each of the information fields is found in sections describing where the information is used. By storing parameter data in a central location, the modification of document segmentation threshold values is easily accomplished.

Remove Noise and Misclassified Vertical Line Segments

At this point in the process many parts of text will have been misclassified as vertical line segments VL (for example the characters '1', 'l' or 'I'. Therefore, the shorter vertical line segments are re-classified as UNKNOWN using the Rule 1 described above. As will be described later, these rectangles may again be reclassified as text rectangles.

At this point, an accurate classification for image picture areas, vertical lines and horizontal lines has been generated. What remains are rectangles classified as type UNKNOWN.

Skew Detection

Skew is a problem well known in the art and refers to document images wherein the lines of text do not lie on a horizontal line. The skew detection method provides for determination of a skew angle. The skew angle of the document can be determined from the list of extracted rectangles that represent the image. The method of determining the skew is not dependant on how the extracted rectangles are derived. So, any means by which a document representation can be accurately made in terms of rectangles, can utilize the skew detection and correction method.

Figure 6:
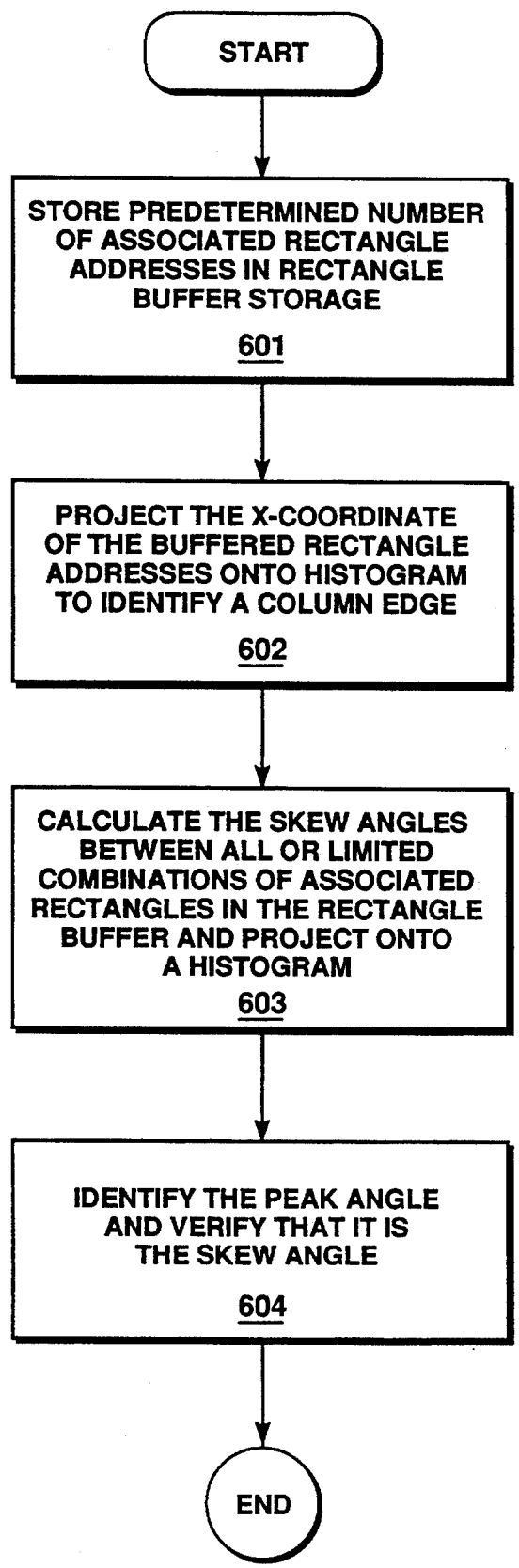
FIG. 6 is a flowchart outlining the steps for skew angle detection as may be performed in an implemented embodiment of the present invention.

The method operates on the premise that character strings are approximated by rectangular boxes. Such rectangles are preferably provided using the rectangle construction method of the implemented embodiment. However, alternative methods of providing rectangles would not depart from the spirit and scope of the present invention. In any event, each rectangle is the boundary of a set of connecting patterns (pixels) that form a word or a letter. The basic flow of the skew method is illustrated in FIG. 6. It should first be understood that the rectangles can be addressed as coordinate points on an X-Y plane. First, address information for a predetermined number of related rectangles are stored in a rectangle buffer location, step 601. It has been determined that 80 rectangles may be accurately used to detect the skew angle. Further, the address information stored is the coordinates for the upper left hand corner of the rectangle. Alternatively, the lower right hand corner of the rectangle would be acceptable, so long as there is consistency for all the rectangle addresses.

Figure 7:
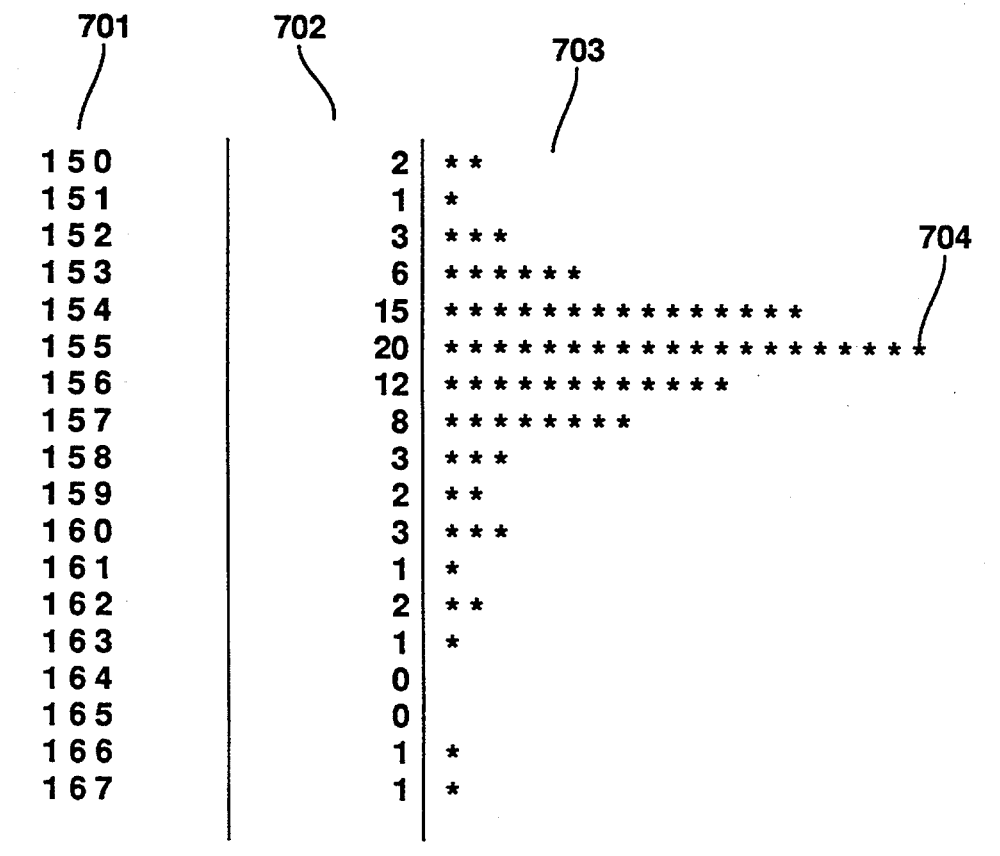

The X-coordinates for each of the addresses are than projected onto a histogram of X-coordinate addresses and a column edge is identified, step 602. Such a histogram is illustrated in FIG. 7. The histogram will indicate the most common X-coordinates. This most common X-coordinate will identify an edge for a column of text. Note that if rectangles are identified by their upper left hand corner point, the left column edge is identified. Conversely, if the lower fight hand corner point is used, the right column edge is identified. Referring to FIG. 7, a first histogram column 701 identifies the X-coordinates being counted, a second histogram column 702 identifies a frequency count, and a third histogram column 703 indicates graphically the relationships of the count at each X-coordinate. As the X-coordinate point 704 has the highest frequency point, it is defined as the column edge. The significance of the identification of a column is that it can be used to limit the rectangles that should be compared when determining a skew angle. The limit being that only rectangles in the same column will be compared.

Figure 8A:
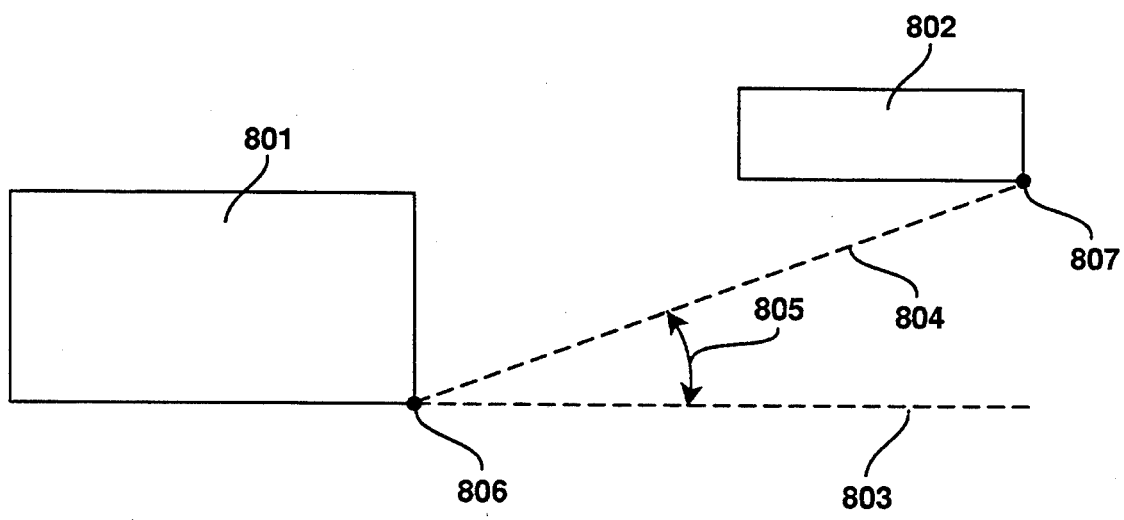
FIG. 8a illustrates a tangential (skew) angle between two rectangles as interpreted by an implemented embodiment of the present invention.

Referring back to FIG. 6, the tangential angle between all associated rectangles in the rectangle buffer are determined and projected onto a histogram to identify a skew angle, step 603. A tangential angle between two rectangles is illustrated in FIG. 8a. A first rectangle 801 and a second rectangle 802 have a skew angle defined by diagonal line 804 and horizontal line 803. The diagonal line 804 extends from the lower right corner 806 of rectangle 801 to the lower right corner 807 of the rectangle 802. The horizontal line 803 extends from the corner 806 of the rectangle 801. Skew angle 805 is calculated by well known trigonometric calculations as follows:

$$\Delta X = abs((X\text{-coordinate of point 806}) - (X\text{-coordinate of point 807}))$$

$$\Delta Y = abs((Y\text{-coordinate of point 806}) - (Y\text{-coordinate of point 807}))$$

$$\text{Skew angle} = (180 * \Delta Y)/(\pi * \Delta X)$$

Here, the absolute values between the coordinate points forming the diagonal line 804 are calculated and are inserted into the skew angle equation.

As noted above, only associated rectangles are compared. Associated rectangles are defined as those that are in the same column and that are suitably far apart. It is noted that rectangles that are in the same column and that are not suitably far apart would cause results that would be misinterpreted when plotted into the created histogram. Rectangles would not be suitably far apart it they are adjacent. In particular, it would cause plotting of false zero skew angles. Further, it would cause unnecessary calculations to be performed.

Figure 8B:
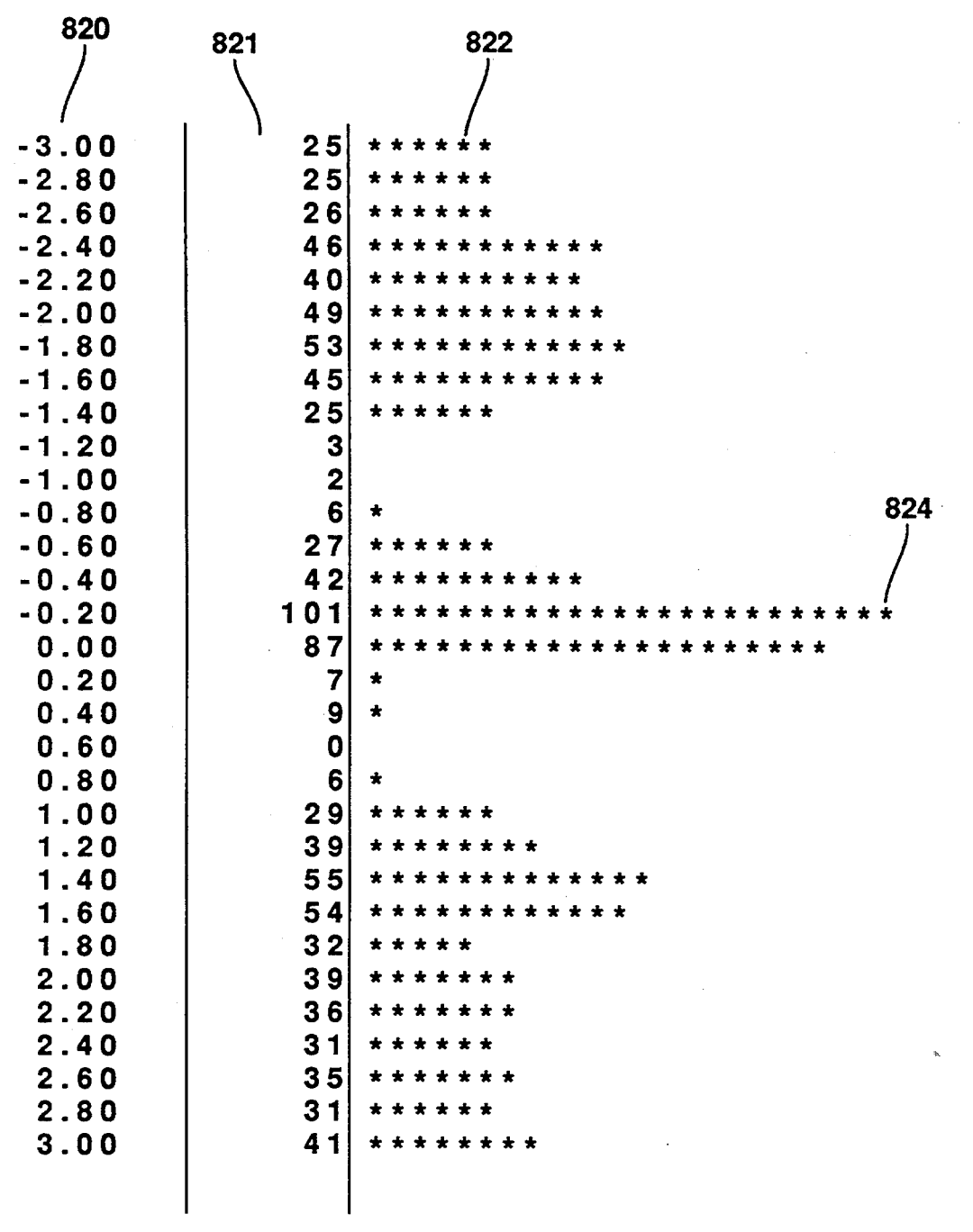

A histogram as may be generated in the implemented embodiment is illustrated in FIG. 8b. The histogram will indicate a distribution of the tangential angles for the compared rectangles. A first histogram column 820 will indicate the various skew angles, a second histogram column 821 will indicate a frequency count for the particular tangential angle and a third histogram column 822 will graphically indicate the distribution for the tangential angles.

Referring back briefly to FIG. 6, the final step is to determine the actual skew angle by identifying the peak angle, and verifying this is the skew angle, step 604. This is accomplished by analysis of the data obtained in generating the skew angle histogram. Assuming that a particular skew angle "Ai" is addressed on the histogram as hist-slope (Ai), the angle which gives the maximum value of the equation:

$$\text{Hist}(Ai) = \text{hist\_slope}(Ai-1) + \text{hist\_slope}(Ai) + \text{hist\_slope}(Ai+1)$$

is the skew angle. This equation is typically satisfied by the peak value in the histogram. Referring to FIG. 8b, the angle 824 is the peak angle that would satisfy the equation. Thus, the angle 824 is the skew angle.

Skew Angle Correction of Constructed Rectangles

Figure 9A:
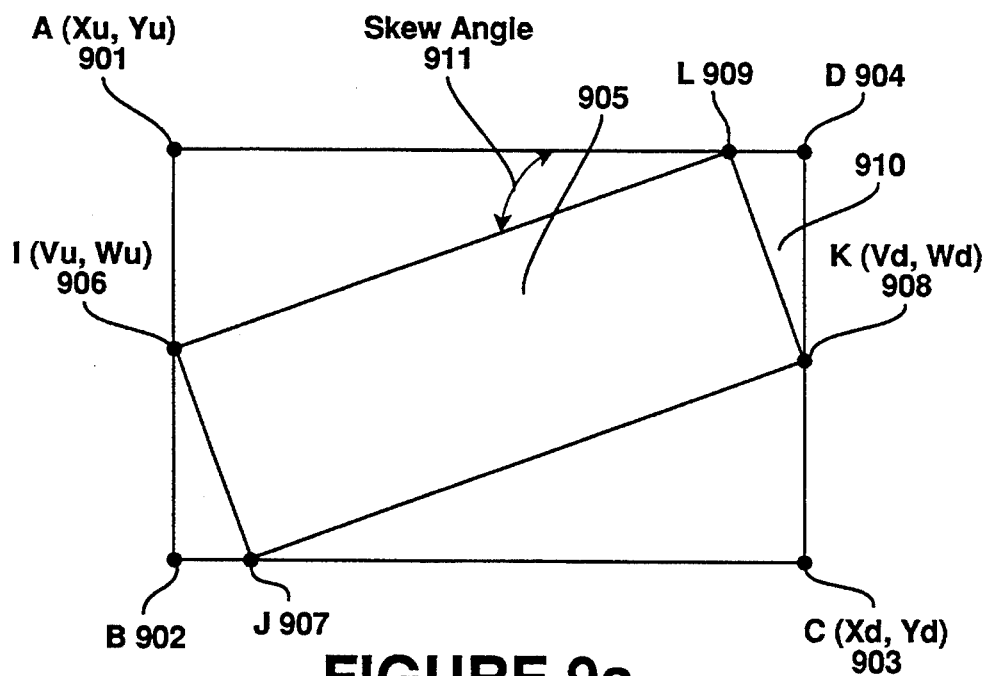
FIG. 9a illustrates a relationship between a real positively skewed rectangle and a non-skewed extracted rectangle as interpreted by an implemented embodiment of the present invention.
Figure 9B:
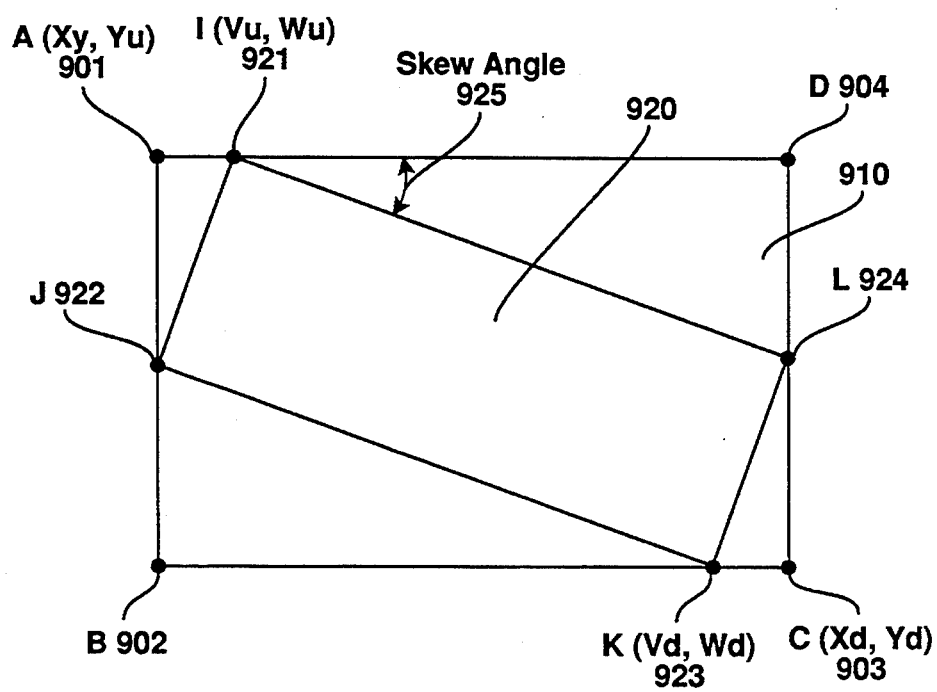
FIG. 9b illustrates a relationship between a real negatively skewed rectangle and a non-skewed extracted rectangle as interpreted by an implemented embodiment of the present invention.

The detected skew angle will be used to correct the skew of the extracted rectangles. If the image is corrected for skew, then the rectangles representing the image must also be corrected. The correction of constructed rectangles involves basically two steps; 1) derivation of a real skewed rectangle and 2) rotation of the real skewed rectangle to effect the skew angle correction. FIGS. 9a and 9b illustrate positively and negatively skewed rectangles, respectively. A rectangle is defined as having a positive skew if when scanning from top to bottom, the upper left corner is encountered first. A rectangle is defined as having a negative skew if when scanning from top to bottom, the upper right corner is encountered first. In both FIGS. 9a and 9b, rectangle 910 defined by points A 901, B 902, C 903 and D 904 is an outer rectangle which represents an extracted skewed rectangle. Normally, the skewed image will cause construction of a larger rectangle than an unskewed image.

Referring to FIG. 9a, extracted rectangle 910 is positively skewed. A corresponding unskewed rectangle 905 is defined as having the points I 906, J 907, K 908 and L 909. A skew angle 911 is defined in this case as the angle defined by the points A 901, L 909 and I 906. The following notation is used to describe the relationship between the skewed and unskewed rectangles:
{(Vu, Wu), (Vd, Wd)} denotes the rectangle 905,
{(Vu, Wu), (Vd, Wd)} denotes an unskewed rectangle
defined by points I 906, J 907, K 908 and L 909,
the skew angle is denoted as 'a',
W is the length between points A 901 and D 904, and
H is the length between the points A 901 and B 902.

The relationship between the skewed and unskewed rectangles can thus be defined as:

$$Vu = Xu;$$

$$Wu = Yu + \sin|a| * \frac{W*\cos|a| - H*\sin|a|}{\cos^2|a| - \sin^2|a|} \quad \text{expression (1)}$$

$$Vd = Xd;$$

$$Wd = Yd - \sin|a| * \frac{W*\cos|a| - H*\sin|a|}{\cos^2|a| - \sin^2|a|} \quad \text{expression (2)}$$

By inserting the appropriate values, the rectangle 905 may be generated.

Referring to FIG. 9b, the image has an axial symmetry of the positive skew case. Here a negatively skewed rectangle is again denoted by rectangle 910. A corresponding unskewed rectangles is defined as having points I 921, J 922, K 923 and L 924. Further, in this case a skew angle 925 is the angle defined by the points D 904, I 921 and L 924. Using the above definitions, the relationship between the skewed and unskewed rectangles can be described as:

$$Wu = Yu;$$

$$Vu = Xu - \sin|a| * \frac{W*\cos|a| - H*\sin|a|}{\cos^2|a| - \sin^2|a|} \quad \text{expression (3)}$$

$$Wd = Yd;$$

$$Vd = Xd + \sin|a| * \frac{W*\cos|a| - H*\sin|a|}{\cos^2|a| - \sin^2|a|} \quad \text{expression (4)}$$

By inserting the appropriate values, the rectangle 920 may be generated.

With respect to boundary conditions, from the definition of Wu, Vu, Wd, Vd, the following conditions hold from expression (1), $$Yu = <Yu + \sin|a| * \frac{W*\cos|a| - H*\sin|a|}{\cos^2|a| - \sin^2|a|} \quad \text{expression (5)}$$

Once the real skewed coordinates are defined for each extracted rectangle, the whole set of coordinates of rectangles representing the image is rotated by the angle 'a' around the origin. The operation is performed using a matrix transformation defined as:

$$\begin{pmatrix} Xu' \\ Yu' \end{pmatrix} = \begin{pmatrix} \cos(a) & -\sin(a) \\ \sin(a) & \cos(a) \end{pmatrix} \begin{pmatrix} Xu \\ Yu \end{pmatrix}$$

where 'a' is skew angle detected above. The coordinates Xu', Yu' represent corrected coordinates for the rectangle.

Verification of Rectangle Classification

Consistent with the bottom-up method of the implemented embodiment, as the process moves to higher levels of data representation it becomes necessary to check the accuracy of all the rectangles classified up to this point. It may also be necessary to re-classify some rectangles. The verification and re-classification rules are the same as those described in the classification rules described above.

Creation of Text Blocks from Rectangles of Type UNKNOWN

Up to this point rectangles have been classified as either image (IMG), horizontal line (HL) or vertical (VL) line. All other rectangles have been classified as UNKNOWN. These UNKNOWN rectangles represent the text in the document or any text like noise. The next process is to find rectangles that can be merged into blocks that can be classified as lines of text. Such merged blocks are classified as type CHAR.

It is first noted that the term block is used to refer to a grouping of merger rectangles. A grouping of merged UNKNOWN rectangles is termed a text block. It is further noted that rectangles of type IMG will never get merged. This is implicit in the criteria by which a rectangle gets classified as a type IMG.

The first step is to estimate the average height of rectangles in the document. Based on what this value is computed as, the horizontal and vertical merge thresholds are set appropriately. The method for estimating the average rectangle size may be done for the entire document, or for associated clusters of rectangles. In the latter case, the merging of clusters will utilize the cluster average in determining the appropriate horizontal and vertical merge thresholds. Clusters of rectangles are identified by known methods of clustering, e.g. using the nearest neighbor algorithm where rectangles are clustered based on their mean distance apart.

The merging process then involves horizontal merger and vertical merger. In horizontal merger, care must be taken not to merge text rectangles that may be adjacent, but in different columns. Recall that column edge identification was described above with respect to skew angle detection. During the horizontal merger step, rectangles that are classified as UNKNOWN and smaller in boundary length than the threshold noise length, are deleted as noise. Remaining horizontally merged rectangles are classified as text (i.e. assigned type CHAR).

The vertical merger step involves taking the horizontal lines of text and merging in the vertical direction. If an overlap exists between a text rectangle and a rectangle of type IMG, HL, or VL, then these rectangles are deferred for later processing.

Merger between two rectangles in the implemented embodiment will occur when the rectangles are of the same type and are within a predetermined horizontal or vertical merge threshold, respectively. Such thresholds are dependent on image resolution and average rectangle height. TABLE D illustrates such thresholds for a document with 300 dpi resolution.

TABLE D

| | MERGER THRESHOLDS | | |
|---|---|---|---|
| Average Rectangle Height | $2 = <X < 10$ | $X > = 10$ | $X < = 2$ |
| Horizontal Merge Threshold | 5 pixels | 10 pixels | 3 pixels |
| Vertical Merge Threshold | 5 pixels | 10 pixels | 3 pixels |

Merger is accomplished by modifying coordinate fields in a rectangle variable representing the definition of the rectangle merged into, to reflect a larger merged rectangle. The definition of the rectangle that was merged from may then be discarded.

Creation of Text Blocks within Image Rectangles

A rectangle that is external to an image rectangle cannot be merged with a rectangle that is internal to an image rectangle. A rectangle is internal if it lies completely within or overlaps an image rectangle. Rectangles internal to an image rectangle are treated as a special case. For example, such an instance may occur on a document when a legend for a diagram is superimposed on the diagram.

Figure 10A:
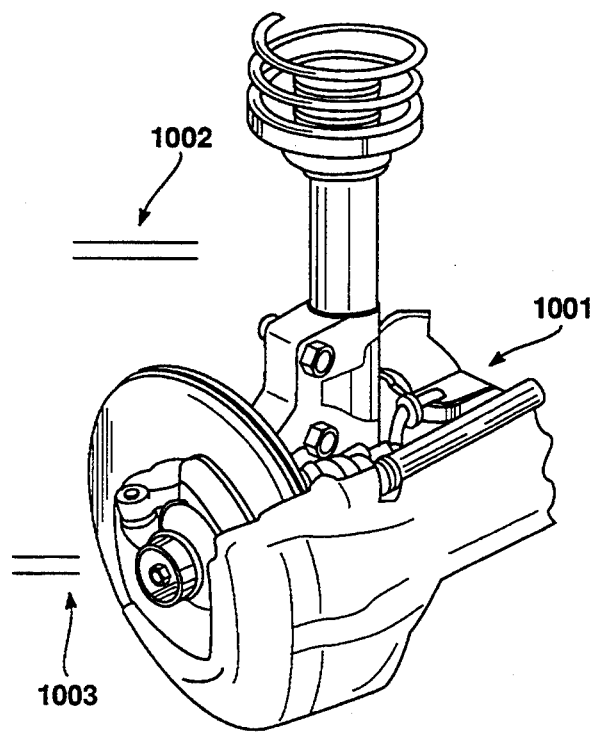
FIG. 10a-10b illustrates the merging of text blocks within an image rectangle as may be performed in an implemented embodiment of the present invention.
Figure 10B:
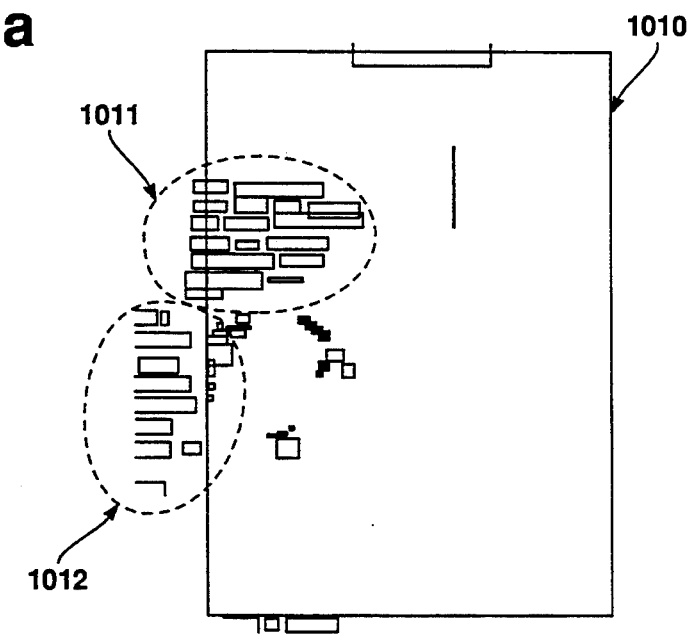

In the case of a rectangle internal to an image rectangle, merging is performed using the same merge parameters as before (e.g. as illustrated in Table D). Such a case is illustrated in FIGS. 10a–10b. FIG. 10a illustrates a document with a graphical image 1001 (a portion of automobile's suspension system) that has accompanying text describing it, i.e. text areas 1002 and 1003. FIG. 10b illustrates the results after the steps of run-length extraction and rectangle extraction of the digital image representation of the document. A rectangle 1010 corresponds to graphical image 1001. The rectangle 1010 is of type IMG. Further, a first grouping of rectangles 1011 corresponds to text area 1002 and a second grouping of rectangles 1012 corresponds to text area 1003. Each of the rectangles in the groupings 1011 and 1012 are of type UNKNOWN. The rectangles in the grouping 1011 cannot be merged as they overlap with the IMG rectangle 1010.

Ordering of Text Blocks

The final step of the document segmentation is to provide a logical order for the blocks of text. A one-hundred percent accurate ordering is dependent on what rules were used when the page was originally laid out. These rules may change considerably between different document layouts. Therefore, it is conceded to be virtually impossible to construct a general sorting method that will work for all document layouts.

However, it is possible to approximate the correct order. The sorting method used in the implemented embodiment is based on counting the number of text block 'above' and 'to the left of' the block under consideration. 'Above' and 'to the left of' are in reference to the geometrical layout of a document.

Figure 11:
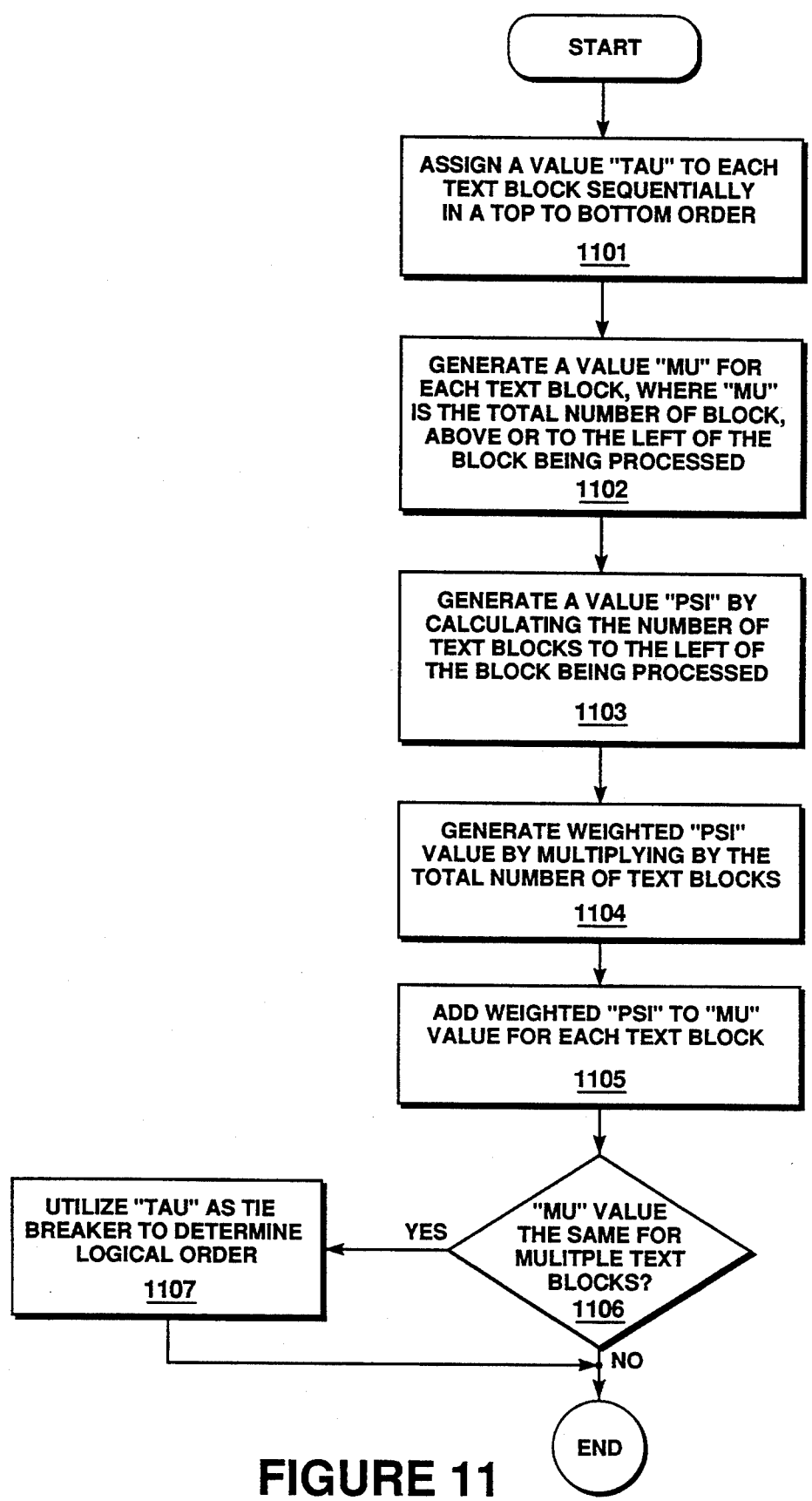
FIG. 11 is a flowchart illustrating the method of ordering of text blocks as may be utilized by an implemented embodiment of the present invention.
Figure 12:
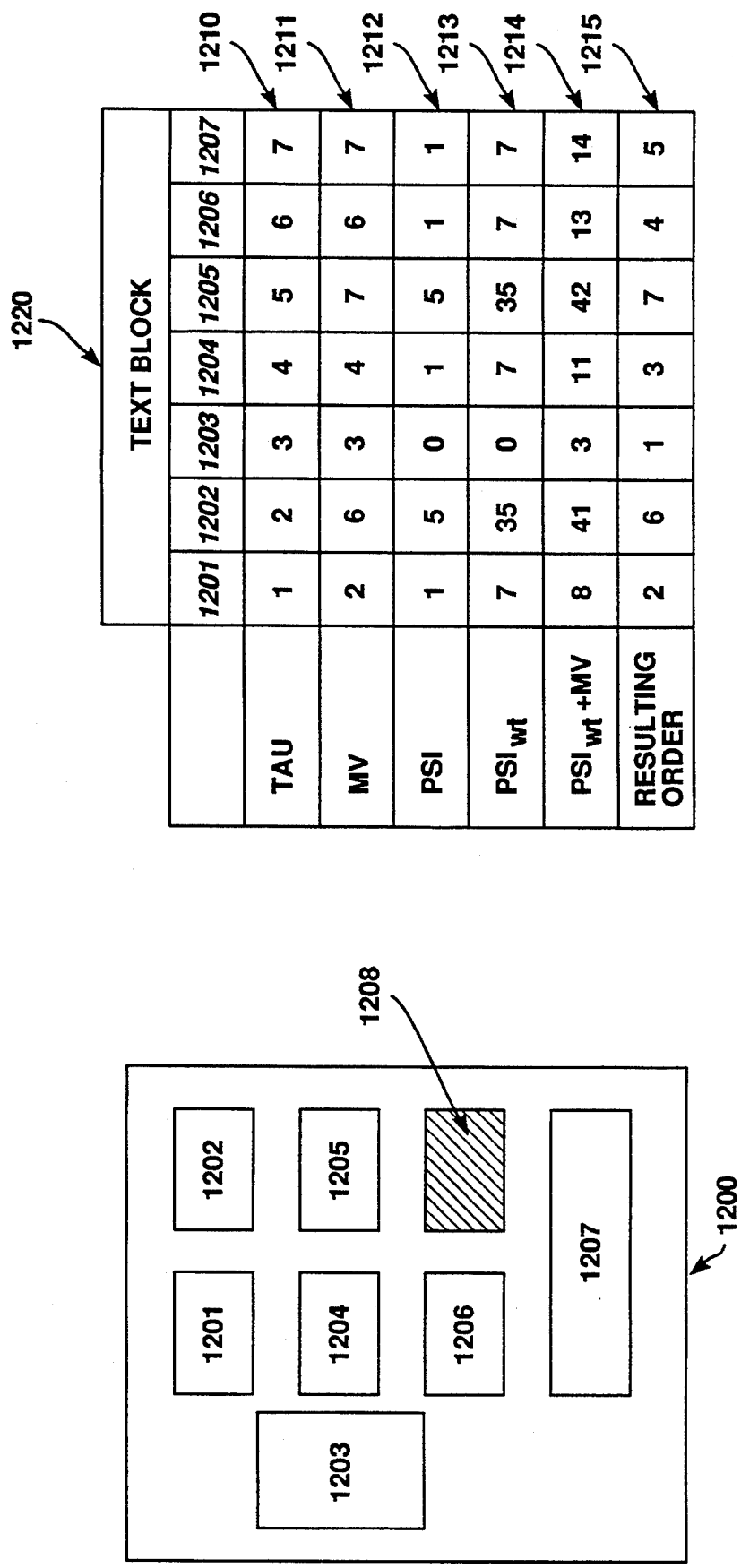
FIG. 12 illustrates a document image comprised of text blocks and how they would be ordered in an implemented embodiment of the present invention.

The block ordering method of the implemented embodiment illustrated is described with reference to FIGS. 11 and 12. FIG. 11 is a flowchart illustrating the steps taken in order to determine the logical block ordering of the various text blocks on a document image. FIG. 12 illustrates a document image and a resulting value table used to calculate the logical ordering of the text blocks. Referring now to FIG. 11, a first step is to assign a 'TAU' value to each text block in the document, step 1101. The 'TAU' values are assigned in sequential order starting from 1, from the top to the bottom of the document image. Note that this is typically the same order in which the text blocks are constructed. Referring now to FIG. 12, a document image 1200 with text blocks 1201–1207 is illustrated. Further illustrated in FIG. 12 is a image rectangle, 1208. It should be noted that image rectangle 1208 is not assigned a 'TAU' value. Traversing the document in a left to right top to bottom order, it is apparent that the left-most top text block is the block 1201. Thus, the text block 1201 is assigned a 'TAU' value of 1. The next text block to satisfy the left-most top to bottom criteria is text block 1202. Accordingly, the text blocks 1202 is assigned a 'TAU' value of 2. This continues until a 'TAU' value of 7 is assigned to text block 1207. The 'TAU' value for each of the text blocks 1201–1207 is illustrated in Chart 1220. Here a 'TAU' row, 1210 indicates all the 'TAU' values for each of the text blocks. The 'TAU' sequence of ordering the blocks is termed the geometric order of the text block.

Once the 'TAU' values have been generated, the next step is to generate a 'MU' value for each text block, step 1102. The 'MU' value is a first step in determining a logical ordering for the text blocks. A 'MU' value for a text block is generated from the total number of blocks, including the text block, above, or to the left of the text block. Referring to FIG. 12, row 1201 of chart 1220 illustrates the 'MU' values generated for texts blocks in the document image 1200. For example, the 'MU' value for the text block 1204 is 4. This is because the text blocks 1203, 1201 and 1202 satisfy the criteria of being above or to the left of the block. The 'MU' value of the text blocks provides a logical ordering from a left to right top to bottom stand point.

In general, the evaluation of 'MU' weights the top to bottom geometrical order by considering the left to right position in the page. The resultant is a value giving an order top/left to bottom/right. However, if text blocks are aligned top to bottom in the document, the precedence must be given to reaching the bottom of the text column before proceeding to the next text block to the right. Such a precedence is enabled by calculating a value 'PSI' for each text block.

Referring back to FIG. 11, a 'PSI' value is then calculated for each of the text blocks in the document image by summing the number of text blocks to the left of the block being processed, step 1103. As noted above, the 'PSI' value provides a means for ordering text when they are in a column format. Referring now to FIG. 12, row 1212 of chart of 1220 illustrates the generated 'PSI' values. For example, the text blocks 1205 has a 'PSI' value of 5. This is because the blocks 1201–1203, 1204, 1206, and 1207 satisfy the criteria of being to the left of the text block 1205.

Referring back to FIG. 11, the next step is to weight the 'PSI' value by multiplying the original 'PSI' value by the number of text blocks, step 1104. It has been determined that this weighting step is desirable in order to provide a more accurate logical ordering of the text blocks. In any event, referring back to FIG. 12, the weighted 'PSI' value is illustrated by row 1213 of chart 1220.

To determine the final logical ordering, the weighted 'PSI' is added to the 'MU' value for each text block, step 1105. It has been determined that this resulting value gives a very good approximation of the logical ordering of the text blocks on the document. Referring to FIG. 12, this is illustrated in row 1214 of chart 1220. Referring back to FIG. 12, it is then determined whether or not there are any weighted 'PSI' and 'MU' values which are equal, step 1106. If any of the values are the same, then the block ordering would not provide useful information, as multiple text blocks would have the same logical ordering value. If no 'MU' values are the same, then the text block ordering process is completed. If there are 'MU' values which are identical, then the geometric ordering of the text blocks is considered, step 1107. Recall that the geometric ordering is the 'TAU' value that was first calculated.

Referring back to FIG. 12, it is clear that no text block has the same 'MU' value. Thus, the resulting order for the text blocks of document image 1200 is 1203, 1201, 1204, 1206, 1207, 1202, and 1205. This is a column type format, as found in newspapers and magazines. Once the block ordering is completed, the text blocks can be provided to a character recognition program for providing a logical ordering of the characters on the document page.

Finally, it should be noted the criteria for identify a text block as "above and to the left of" is met by any text block that has a point clearly above and to the left of any point of a text block that is in question. However, the criteria of "to the left of" requires that more than half of a text block be located horizontally to the left of a text block that is in question.

Once block ordering is completed, the segmented text blocks information must be provided to a character recognition or a form that is usable. As the representation of the image has been compressed, the actual coordinate addresses corresponding to the blocks must be provided. This is accomplished by re-scaling the representation back to the dimensions of the original, uncompressed document image.

Example of Document Segmentation Method

Figure 13:
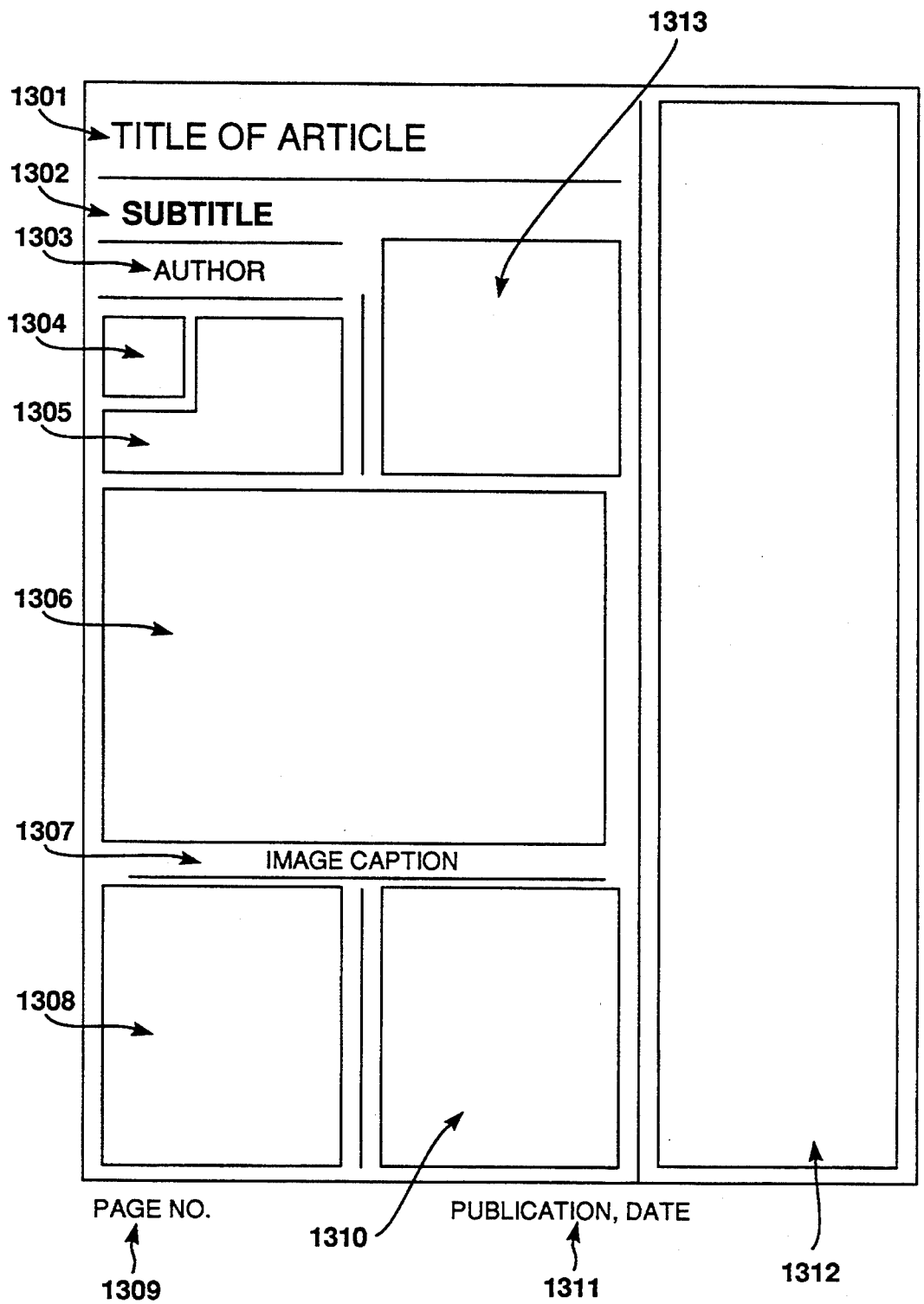
FIG. 13 is an example of a page of document text that will be segmented by an implemented embodiment of the present invention.

FIGS. 13–17 illustrate the various steps of the document segmentation method of the implemented embodiment. It should be noted that the FIGS. 14–17 need not actually be created during the document segmentation process but are provided here for illustrative purposes of the method steps. In any event, FIG. 13 illustrates a format of a printed page as provided to a scanning means. It should be noted that FIG. 13 corresponds to an actual published single page magazine article. The remainder of FIGS. 14–17 were generated on a system of the implemented embodiment from the single page magazine article. Referring back to FIG. 13, the document image contains text in title area 1301, subtitle area 1302, author area, image caption area 1307, page number area 1309, publication/date area 1311 and column text areas 1305, 1308, 1310, 1312 and 1313. Image areas 1304 and 1306 are also on the document page.

Figure 14:
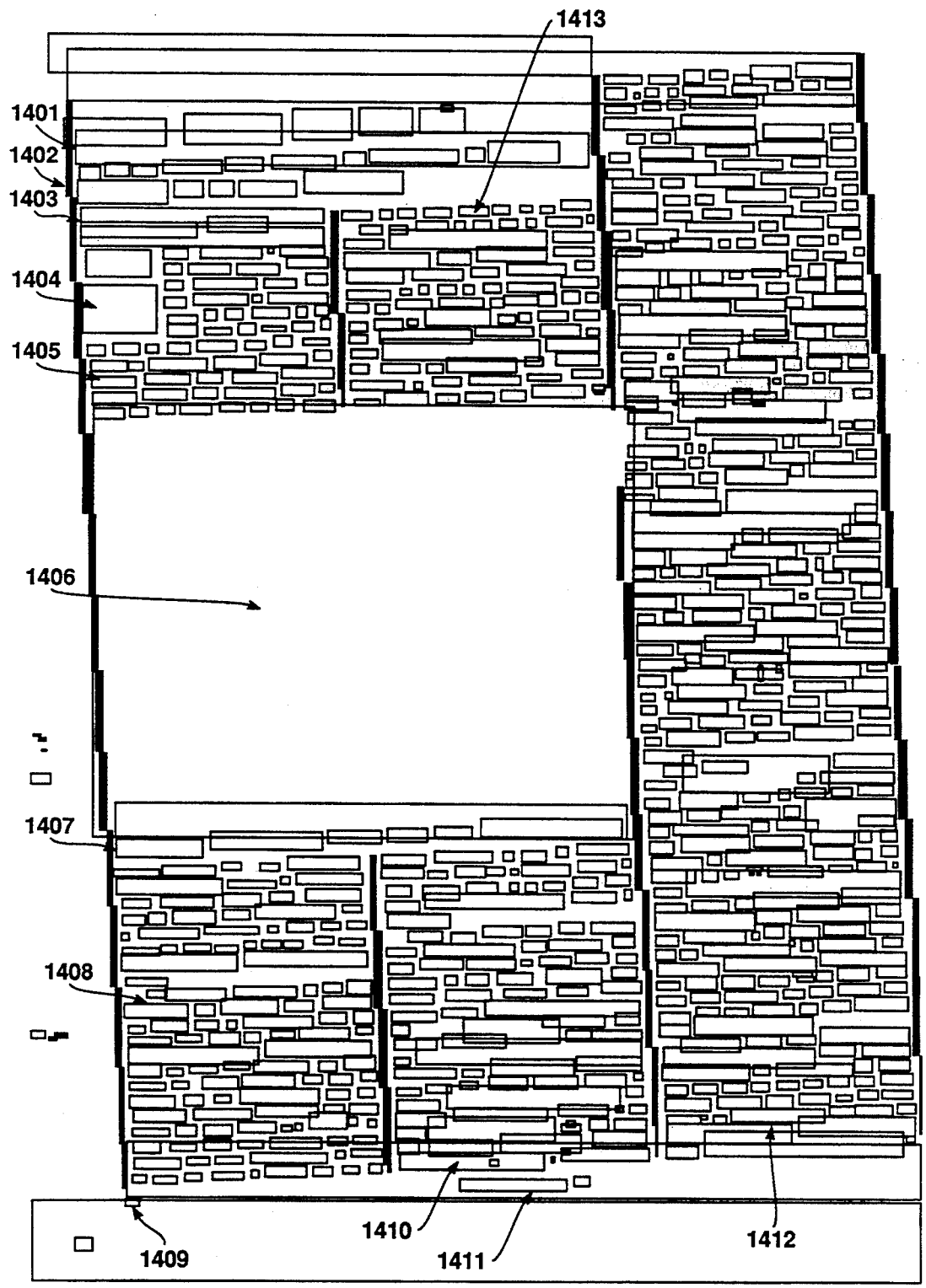
FIG. 14 is a representation of the document page of FIG. 13 as a set of extracted rectangles as provided by an implemented embodiment of the present invention.

Referring now to FIG. 14, a representation of the image as a set of extracted rectangles is illustrated. It should be noted that each rectangle corresponds to a word, string of words or an image. In FIG. 14, the image is skewed. However, the major features of the document layout are identifiable. Each of the areas 1401–1413 have a direct relationship with an area 1301–1313 of FIG. 13 (i.e. title area 1301 corresponds to area 1401, subtitle area 1302 corresponds to area 1402, etc.).

Figure 15:
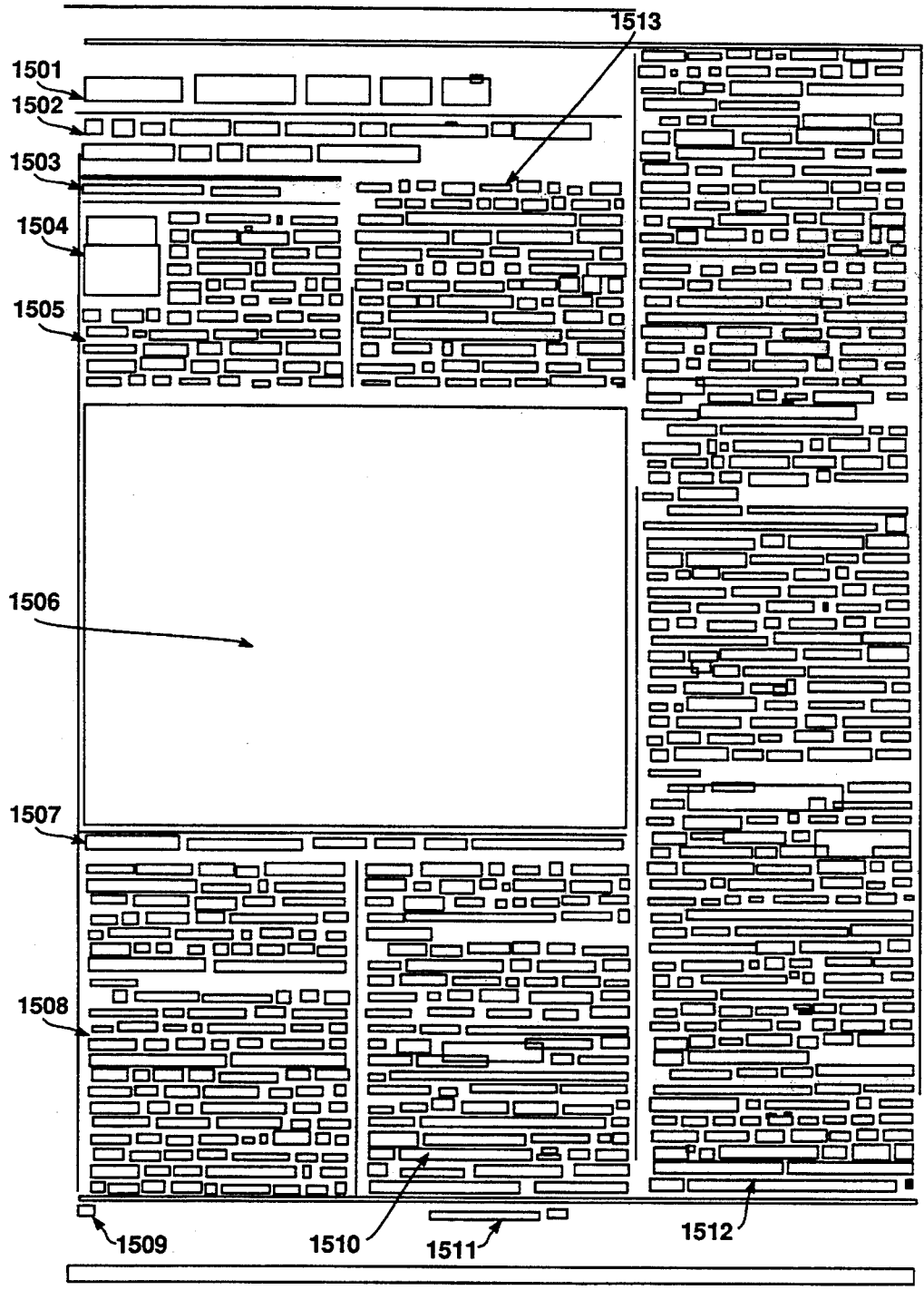
FIG. 15 is a deskewed representation of the document representation of FIG. 14 as provided by an implemented embodiment of the present invention.

FIG. 15 illustrates the rectangles after the skew has been corrected. Here, the significant features of the original document correspond more closely to the document image of FIG. 13. Again, each of the areas 1501–1513 have a direct relationship with an area 1301–1313 of FIG. 13 (i.e. title area 1301 corresponds to area 1501, subtitle area 1302 corresponds to area 1502, etc.).

Figure 16:
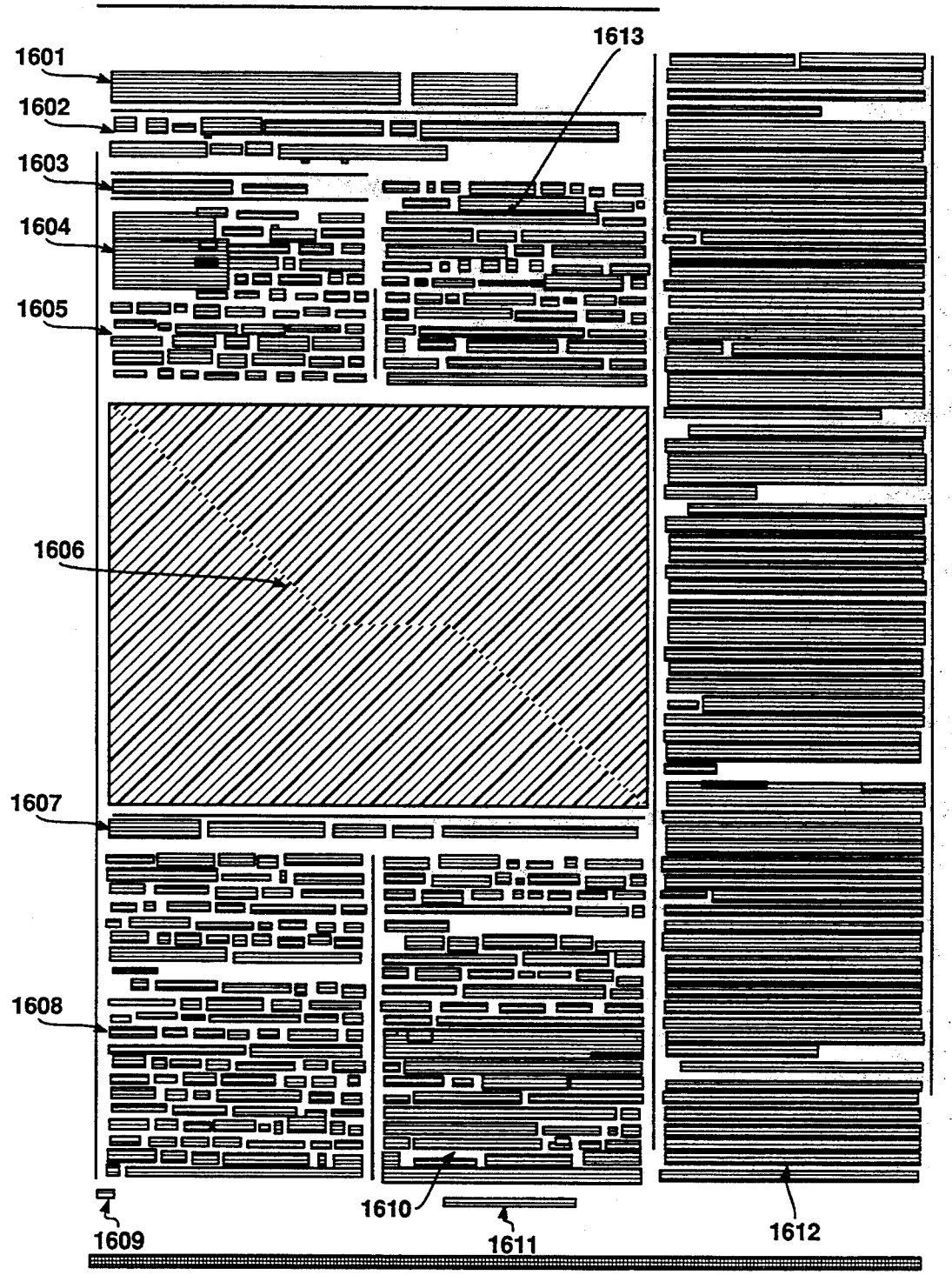
FIG. 16 is a representation of the document page of FIG. 13 wherein rectangles have been classified and text lines merged as provided by an implemented embodiment of the present invention.

Referring to FIG. 16, the rectangle classification of the merger of text lines as occurred. Again, each of the areas 1601–1613 have a direct relationship with an area 1301–1313 of FIG. 13 (i.e. title area 1301 corresponds to area 1601, subtitle area 1302 corresponds to area 1602, etc.).

Figure 17:
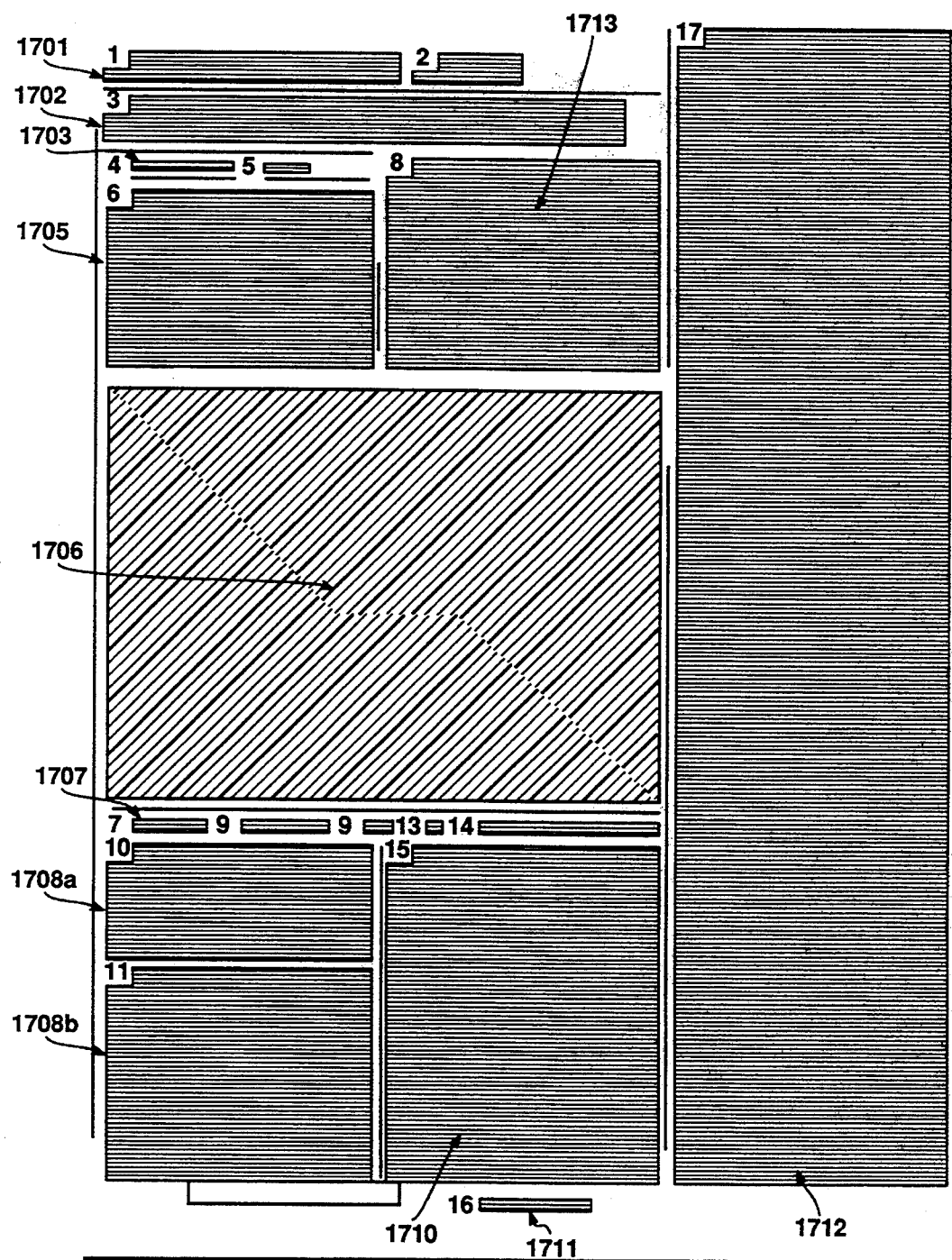
FIG. 17 is a representation of the document page of FIG. 13 wherein text blocks have been merged and ordered as provided by an implemented embodiment of the present invention.

Finally, with reference to FIG. 17 the rectangles of type UNKNOWN have been merged to form text blocks. Further, the text blocks have been ordered. The order is indicated by an integer value located in the upper left portion of the text block. Thus, upon character recognition and reducing the document image to a text file, the text will appear in that file in the indicated order.

Thus, a method for segmenting a document image is described. By providing a compressed representation of the features of the document image as rectangles, text and non-text may be accurately and efficiently distinguished.

We claim:

1. A document segmentation system for determining text and non-text portions of a document image, said document segmentation system having a skew corrector, said skew corrector comprised of:
a memory storing said document image; and
a processor, being coupled to said memory, said processor including,
a rectangle extractor coupled to said memory and providing output to said memory, said rectangle extractor providing as output a plurality of rectangles representing said document image, each of said plurality of rectangles representing a portion of said document image,
a skew angle detector coupled to said memory, said skew angle detector detecting a skew angle using a column edge $C_e$ and at least a first rectangle and a second rectangle of said plurality of rectangles, said skew angle detector detecting said column edge $C_e$ from at least said first rectangle and said second rectangle, said first rectangle and said second rectangle being in a common column corresponding to said column edge $C_e$, said skew angle being an angle between said first rectangle and said second rectangle, and
a rectangle corrector coupled to said skew angle detector and said memory, said rectangle corrector correcting the skew of all of said plurality of rectangles.

2. The skew corrector of claim 1 wherein said skew angle detector is further comprised of:
a rectangle buffer receiving and storing a predetermined number of rectangles from said memory;
a column edge detector coupled to said rectangle buffer, said column edge detector determining a column edge associated with rectangles in said rectangle buffer;
a rectangle identifier coupled to said column edge detector and said rectangle buffer, said rectangle identifier determining that said first rectangle and said second rectangle are in said common column and are a predetermined distance apart;
a tangential angle processor coupled to said rectangle identifier, said tangential angle processor generating a plurality of tangential angles, a tangential angle being generated using said first rectangle and said second rectangle; and
a peak angle detector coupled to said tangential angle processor, said peak angle detector identifying a tangential angle that is most common and outputting said tangential angle as said skew angle.

3. The skew corrector as recited in claim 2 wherein said rectangle corrector is further comprised of:
a real skewed rectangle constructor coupled to said memory and said peak angle detector, said real skewed rectangle constructor constructing a real skewed rectangle from a corresponding rectangle in said memory; and
a transformer coupled to said real skewed rectangle constructor, said transformer rotating said real skewed rectangle an angle corresponding to said skew angle and outputting a skew corrected rectangle.

4. An apparatus for identifying a skew angle of a document, said document represented as one or more objects, said apparatus comprising:
a object buffer for storing a subset of said one or more objects;
a processor, being coupled to said object buffer, including, column edge identifier coupled to said object buffer, said column edge identifier for identifying a column edge for said objects in said object buffer,
object identifier coupled to said column edge identifier and said object buffer, said object identifier for identifying, and providing as output, objects in said object buffer that are in a column defined by said column edge and that are a predetermined distance apart,
tangential angle generator coupled to said object identifier, said tangential angle generator for calculating and providing as output a plurality of tangential angles, a tangential angle generated using a first object and a second object, and
tangential angle counter coupled to said tangential angle generator, said tangential angle counter for counting tangential angles and identifying a most common tangential angle as said skew angle.

5. An apparatus for correcting the skew of a document image, said apparatus comprising:
a) a memory storing said document image, said document image defining a column, said document image including a first object and a second object, each of said objects representing a different portion of said column, and
b) a processor being coupled to said memory, said processor accessing said document image, said processor including
a column detector detecting that said first object and said second object are in said column,
a column edge generator being coupled to said column detector, said column edge generator generating a column edge corresponding to said column,
a skew angle generator being coupled to said column edge generator, said skew angle generator generating a skew angle, said skew angle being an angle between said first object and said second object, and
a skew corrector coupled to said skew angle generator, said skew corrector rotating said first object and said second object by said skew angle.

6. A document segmentation system having skew correction of document images, said document segmentation system comprising:
a memory storing a skewed document image, said skewed document image including a plurality of polygons, each polygon representing a portion of said skewed document image; and
a processor, being coupled to said memory, accessing said skewed document image, said processor determining pairs of polygons of said plurality of polygons, wherein each pair of said pairs of polygons includes only polygons in a common column, said processor determining a plurality of angles between said pairs of polygons, said processor determining said skew angle from said image and said skew angle.

* * * * *